US012725112B2

(12) United States Patent
Robinson et al.

(10) Patent No.: US 12,725,112 B2
(45) **Date of Patent: *Sep. 1, 2026**

(54) INTEGRATED ROOFING ACCESSORIES FOR UNMANNED VEHICLE NAVIGATION AND METHODS AND SYSTEMS INCLUDING THE SAME

(71) Applicant: BMIC LLC, Dallas, TX (US)

(72) Inventors: Rich Robinson, Round Rock, TX (US); Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/958,753

(22) Filed: Nov. 25, 2024

(65) Prior Publication Data

US 2025/0086569 A1 Mar. 13, 2025

Related U.S. Application Data

(63) Continuation of application No. 17/550,619, filed on Dec. 14, 2021, now Pat. No. 12,190,275, which is a (Continued)

(51) Int. Cl.
*G08G 5/54* (2025.01)
*G05D 1/00* (2024.01)
(Continued)

(52) U.S. Cl.
CPC .......... *G06Q 10/083* (2013.01); *G05D 1/101* (2013.01); *G05D 1/46* (2024.01); *G08G 5/54* (2025.01);
(Continued)

(58) Field of Classification Search
CPC .. G06Q 10/083; G05D 1/101; G05D 2109/20; G08G 5/0069; G08G 5/025; G08G 5/0013; G08G 5/0026; G08G 5/0065
See application file for complete search history.

(56) References Cited

U.S. PATENT DOCUMENTS 4,649,675 A * 3/1987 Moldovan ................. E04H 3/00 52/27
7,165,363 B2 * 1/2007 Headrick, II ......... E04D 13/176 454/365
(Continued)

FOREIGN PATENT DOCUMENTS

WO 2018/065977 A1 4/2018

OTHER PUBLICATIONS

Druehl, "Drone Delivery: the Potential Impact on the Built Environment"; https://business.gmu.edu/blog/realestate/2018/05/20/drone-delivery-potential-impact-built-environment/ (2018).

*Primary Examiner* — Sohana Tanju Khayer
(74) *Attorney, Agent, or Firm* — GREENBERG TRAURIG, LLP

(57) ABSTRACT

In some embodiments, the present disclosure provides systems and methods enabling unmanned vehicle navigation and delivery including an integrated roofing accessory integrated into a roof, the integrated roofing accessory including at least one antenna and a computing module in communication with the at least one antenna, where the computing module, when software is executed, is configured to transmit, via the at least one antenna: electronic operating instructions to at least one unmanned vehicle, and network messages related to the at least one unmanned vehicle to at least one additional integrated roofing accessory. A landing member is on the roof and the electronic operating instructions comprise: at least one landing instruction configured to cause the at least one unmanned vehicle to land on the landing member, and at least one take-off instruction configured to cause the at least one unmanned vehicle to take off from the landing member.

20 Claims, 7 Drawing Sheets

Related U.S. Application Data continuation of application No. 17/099,364, filed on Nov. 16, 2020, now Pat. No. 11,222,300.

(60) Provisional application No. 62/935,974, filed on Nov. 15, 2019.

(51) Int. Cl.

| | |
|---|---|
| ***G05D 1/46*** | (2024.01) |
| ***G05D 109/20*** | (2024.01) |
| ***G06Q 10/083*** | (2024.01) |
| ***G08G 5/55*** | (2025.01) |
| ***G08G 5/57*** | (2025.01) |

(52) U.S. Cl.

CPC ................. *G08G 5/55* (2025.01); *G08G 5/57* (2025.01); *G05D 2109/20* (2024.01)

(56) References Cited

U.S. PATENT DOCUMENTS

| | | | | |
|---|---|---|---|---|
| 8,607,778 | B1 | 12/2013 | Sonne et al. | |
| 9,273,885 | B2 * | 3/2016 | Rodrigues | H02S 40/44 |
| 9,302,783 | B2 | 4/2016 | Wang | |
| 9,387,928 | B1 | 7/2016 | Gentry et al. | |
| 9,977,435 | B2 | 5/2018 | Fisher et al. | |
| 10,049,589 | B1 * | 8/2018 | Boyd | G08G 5/32 |
| 10,116,046 | B1 | 10/2018 | Fritzel et al. | |
| 10,176,378 | B1 | 1/2019 | Boyd et al. | |
| 10,425,135 | B2 | 9/2019 | Shattil | |
| 10,625,879 | B2 | 4/2020 | Di Benedetto et al. | |
| 10,640,234 | B1 | 5/2020 | Douglas | |
| 2014/0032034 | A1 | 1/2014 | Raptopoulos et al. | |
| 2014/0259998 | A1 | 9/2014 | Railkar et al. | |
| 2014/0366464 | A1 | 12/2014 | Rodrigues et al. | |
| 2015/0158599 | A1 | 6/2015 | Sisko | |
| 2016/0137311 | A1 | 5/2016 | Peverill et al. | |
| 2017/0032686 | A1 | 2/2017 | Alonso Tabares et al. | |
| 2017/0050749 | A1 | 2/2017 | Pilskalns | |
| 2017/0073085 | A1 | 3/2017 | Tremblay et al. | |
| 2017/0113815 | A1 | 4/2017 | James et al. | |
| 2017/0117676 | A1 | 4/2017 | James et al. | |
| 2017/0193829 | A1 * | 7/2017 | Bauer | G06T 17/05 |
| 2017/0225802 | A1 | 8/2017 | Lussier et al. | |
| 2018/0037172 | A1 | 2/2018 | Nelson et al. | |
| 2018/0105289 | A1 | 4/2018 | Walsh et al. | |
| 2018/0141680 | A1 | 5/2018 | Heinonen | |
| 2018/0237137 | A1 * | 8/2018 | Tovey | G05D 1/0011 |
| 2019/0039751 | A1 | 2/2019 | Janssen | |
| 2019/0063068 | A1 | 2/2019 | Holt et al. | |
| 2019/0127985 | A1 * | 5/2019 | Dundorf | E01H 5/06 |
| 2019/0196512 | A1 | 6/2019 | Blake et al. | |
| 2019/0233135 | A1 | 8/2019 | Cantrell et al. | |
| 2019/0236732 | A1 | 8/2019 | Speasl et al. | |
| 2019/0363843 | A1 | 11/2019 | Gordaychik | |
| 2020/0081153 | A1 | 3/2020 | Schiff et al. | |
| 2020/0198801 | A1 * | 6/2020 | Carthew | B64U 70/30 |
| 2020/0385119 | A1 * | 12/2020 | Hanke | E06B 3/2605 |
| 2021/0031947 | A1 * | 2/2021 | Wankewycz | B60L 53/51 |
| 2021/0352502 | A1 * | 11/2021 | Ginis | H04W 24/02 |
| 2022/0019971 | A1 | 1/2022 | Tazume | |
| 2022/0037774 | A1 | 2/2022 | Morscher et al. | |

* cited by examiner

INTEGRATED ROOFING ACCESSORIES FOR UNMANNED VEHICLE NAVIGATION AND METHODS AND SYSTEMS INCLUDING THE SAME

CROSS-REFERENCE TO RELATED APPLICATIONS

This application is a continuation of U.S. patent application Ser. No. 17/550,619, filed Dec. 14, 2021 and entitled "INTEGRATED ROOFING ACCESSORIES FOR UNMANNED VEHICLE NAVIGATION AND METHODS AND SYSTEMS INCLUDING THE SAME", which is a continuation of U.S. patent application Ser. No. 17/099,364, filed on Nov. 16, 2020, now U.S. Pat. No. 11,222,300 and entitled "INTEGRATED ROOFING ACCESSORIES FOR UNMANNED VEHICLE NAVIGATION AND METHODS AND SYSTEMS INCLUDING THE SAME", which claims priority to U.S. Provisional Application No. 62/935,974, filed on Nov. 15, 2019 and entitled "INTEGRATED ROOFING ACCESSORIES FOR UNMANNED VEHICLE NAVIGATION DELIVERY AND METHODS AND SYSTEMS INCLUDING THE SAME", which are herein incorporated by reference in their entirety.

FIELD OF TECHNOLOGY

The field of the present disclosure relates to integrated roofing accessories and more specifically to uses of integrated roofing accessories in unmanned vehicle navigation and delivery.

BACKGROUND

Rapid deployment and delivery of parcels to customers using unmanned vehicles is a growing field. However, there are barriers the success of such deployment and delivery. Such barriers include, but are not limited to, charging, guidance, storage, distance from origination, relay, repair, notification, and tracking. Methods and systems that will remove these barriers to unmanned vehicle navigation and delivery are needed.

SUMMARY OF THE DISCLOSURE

Systems, methods and apparatuses of embodiments of the present description enable widespread and cost-effective unmanned vehicle communication networks for navigation and delivery by integrating unmanned vehicle infrastructure in roofing accessories that are installable in commercial and/or residential roofing structures.

In some embodiments, the present description provides an exemplary system that include at least the following components: an integrated roofing accessory that is integrated into a roof, where the integrated roofing accessory includes: at least one antenna and a computing module in communication with the at least one antenna. The computing module includes at least one processor and a non-transitory memory storage having software stored thereon, where the computing module, when the software is executed by the at least one processor, is configured to transmit, via the at least one antenna: i) electronic operating instructions to at least one unmanned vehicle, and ii) network messages related to the at least one unmanned vehicle to at least one additional integrated roofing accessory on at least one additional roof, where the at least one additional integrated roofing accessory is configured to transmit the electronic operating instructions to the at least one unmanned vehicle. The system further includes a landing member that is positioned on the roof, where the electronic operating instructions include: i) at least one landing instruction configured to cause the at least one unmanned vehicle to land on the landing member, and ii) at least one take-off instruction configured to cause the at least one unmanned vehicle to take off from the landing member.

Another illustrative embodiment of the present description provides a system that include at least the following components: a plurality of integrated roofing accessories are integrated into a plurality of roofs, where each integrated roofing accessory of the plurality of integrated roofing accessories includes at least one antenna and a computing module in communication with the at least one antenna. The computing module includes at least one processor and a non-transitory memory storage having software stored thereon, where the computing module, when the software is executed by the at least one processor, is configured to transmit, via the at least one antenna: i) electronic operating instructions to at least one unmanned vehicle, and ii) network messages related to the at least one unmanned vehicle to each integrated roofing accessory, where the plurality of integrated roofing accessories are configured to transmit the electronic operating instructions to the at least one unmanned vehicle. The system further includes a plurality of landing members that are positioned on the plurality of roofs, where the electronic operating instructions include: i) at least one landing instruction configured to cause the at least one unmanned vehicle to land on a particular landing member of the plurality of landing members, and ii) at least one take-off instruction configured to cause the at least one unmanned vehicle to take off from the particular landing member.

Another illustrative embodiment of the present description provides a method that includes at least the following steps: obtaining an integrated roofing accessory, where the integrated roofing accessory includes at least one antenna and a computing module in communication with the at least one antenna. The computing module includes at least one processor and a non-transitory memory storage having software stored thereon, where the computing module, when the software is executed by the at least one processor, is configured to transmit, via the at least one antenna: i) electronic operating instructions to at least one unmanned vehicle, and ii) network messages related to the at least one unmanned vehicle to at least one additional integrated roofing accessory on at least one additional roof, where the at least one additional integrated roofing accessory is configured to transmit the electronic operating instructions to the at least one unmanned vehicle; mounting the integrated roofing accessory on a roof. The method further includes obtaining a landing member, and mounting the landing member on the roof; and where the electronic operating instructions include: i) at least one landing instruction configured to cause the at least one unmanned vehicle to land on the landing member, and ii) at least one take-off instruction configured to cause the at least one unmanned vehicle to take off from the landing member.

Another illustrative embodiment of the present description provides a method that includes at least the following steps: controlling, by at least one processor of a computing device of an integrated roofing accessory, at least one antenna according to software to transmit: i) electronic operating instructions to at least one unmanned vehicle, and ii) network messages related to the at least one unmanned vehicle to at least one additional integrated roofing accessory on at least one additional roof, where the at least one additional integrated roofing accessory is configured to transmit the electronic operating instructions to the at least one unmanned vehicle, where the integrated roofing accessory is installed on a roof; causing, by the at least one processor via the network messages, the integrated roofing accessory, the at least one additional integrated roofing accessory, or both, to communicate with at least one unmanned vehicle; and causing, by the at least one processor via the network messages, the at least one unmanned vehicle to navigate to a landing member positioned on the roof.

The systems and methods of some embodiments further include where the landing member is directly connected to the integrated roofing accessory.

The systems and methods of some embodiments further include where the landing member is a horizontal platform.

The systems and methods of some embodiments further include where the at least one unmanned vehicle is configured to transport at least one delivery item, and where the system further includes a receptacle that is configured to accept the at least one delivery item.

The systems and methods of some embodiments further include where the landing member includes the receptacle.

The systems and methods of some embodiments further include where the landing member is configured to allow the at least one unmanned vehicle to be electrically charged from a power supply.

The systems and methods of some embodiments further include where the at least one antenna is embedded within a surface of the integrated roofing accessory.

The systems and methods of some embodiments further include where the integrated roofing accessory and the at least one additional integrated roofing accessory form a computer network based at least in part on the network messages.

The systems and methods of some embodiments further include where the integrated roofing accessory has a right edge, a left edge, a front edge, and a back edge, where one or more of the right edge, the left edge, the front edge, and the back edge is configured to contact at least one additional roofing accessory on the roof.

The systems and methods of some embodiments further include where the at least one additional roofing accessory further includes at least one shingle that is made from a roofing material.

The systems and methods of some embodiments further include where one or more of the right edge, the left edge, the front edge and the back edge is configured to contact the at least one additional roofing accessory on the roof such as to form a seal between the integrated roofing accessory and the at least one additional roofing accessory.

The systems and methods of some embodiments further include a water shedding layer provided on the roof; and where the integrated roofing accessory is mounted over the water shedding layer.

The systems and methods of some embodiments further include where the integrated roofing accessory has a planar shape; and where the integrated roofing accessory is configured to be installed on a face of the roof.

The systems and methods of some embodiments further include where the integrated roofing accessory has a ridge shape; and where the integrated roofing accessory is configured to be installed in a ridge vent of the roof.

The systems and methods of some embodiments further include where the plurality of integrated roofing accessories includes at least three integrated roofing accessories integrated into at least three roofs.

BRIEF DESCRIPTION OF THE DRAWINGS

Some embodiments of the disclosure are herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
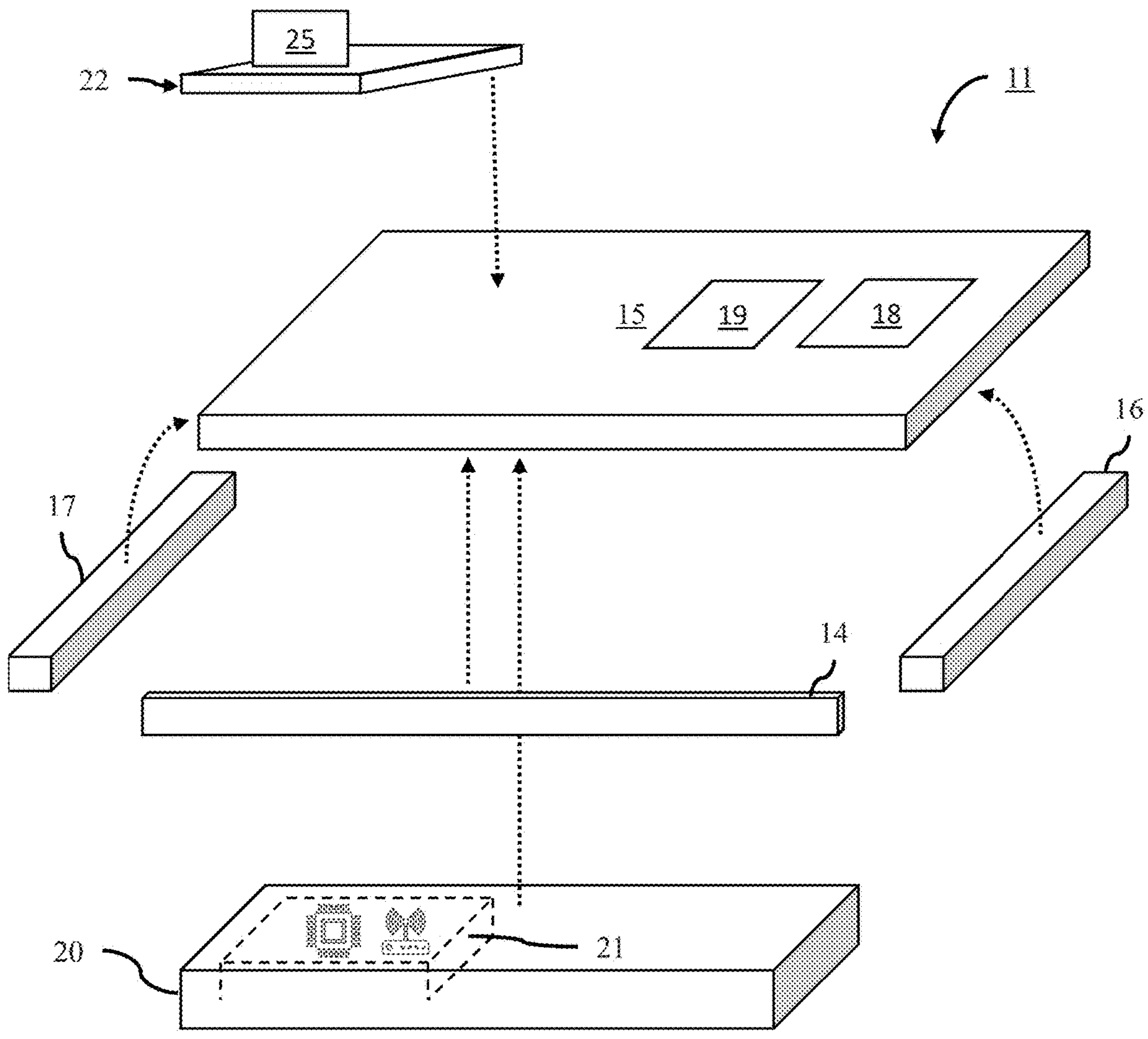
FIG. 1 depicts a non-limiting embodiment of an integrated roofing accessory according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

As defined herein, an "integrated roofing accessory" is a roofing accessory having at least one electronic component and at least one roofing accessory component. In some embodiments, an integrated roofing accessory includes at least one electronic component embedded within at least one roofing accessory component.

As used herein a "roofing accessory component" is any part of a roofing accessory. Non-limiting examples of roofing accessory components include: roofing caps, laminate shingles, roofing sheets, ridge caps, ridge vents, roofing frames, the like, or any combination thereof. Additional non-limiting examples of the least one roofing accessory component of the at least one integrated roofing accessory are found in U.S. Pat. Nos. 7,165,363 and 10,180,001, both of which are attached hereto as Appendixes A and B respectively, and both of which are incorporated by reference in their respective entireties.

Non-limiting examples of the at least one roofing accessory component of the at least one integrated roofing accessory include: roofing caps, laminate roofing accessories, roofing sheets, ridge caps, ridge vents, roofing frames, roofing shingles and the like, or any combination thereof. Additional non-limiting examples of the at least one portion of the roofing accessory are found in U.S. Pat. Nos. 7,165,363 and 10,180,001, both of which are incorporated by reference in their respective entireties.

As used herein, the term "antenna" or "antennae" refers to a device that is part of a transmitting or receiving system to transmit or receive electromagnetic signals.

As defined herein, an "unmanned vehicle" is a vehicle without a passenger or navigator on board. Unmanned vehicles may operate autonomously, may be operated by a remote navigator, or any combination thereof. Examples of unmanned vehicles include, but are not limited to: unmanned ground vehicles (UGVs) (e.g., "self-driving" or "autonomous" cars), unmanned aerial vehicles (UAVs) (e.g., "drones"), unmanned underwater vehicles (UUVs) (e.g., "underwater drones"), unmanned surface water vehicles (USVs) (e.g., "self-driving" or "autonomous" boats), and unmanned spacecrafts (e.g., space probes).

As defined herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "route" is a maximum distance that an unmanned vehicle can travel.

As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As defined herein, an "integrated roofing system" is a system including at least one integrated roofing accessory.

Some embodiments of the present disclosure relate to methods and systems that include at least one integrated roofing accessory. Some embodiments of the present disclosure relate to methods and systems that include a plurality of integrated roofing accessories. Some embodiments of the present disclosure relate to methods and systems that include at least three integrated roofing accessories. Some embodiments of the present disclosure relate to methods and systems that include at least five integrated roofing accessories. Some embodiments of the present disclosure relate to methods and systems that include at least ten integrated roofing accessories. Some embodiments of the present disclosure relate to methods and systems that include at least fifty integrated roofing accessories. Some embodiments of the present disclosure relate to methods and systems that include at least one hundred integrated roofing accessories. Some embodiments of the present disclosure relate to methods and systems that include at least one-thousand integrated roofing accessories.

In some embodiments, there are 1 to 10,000 integrated roofing accessories. In some embodiments there are 1 to 5000 integrated roofing accessories. In some embodiments, there are 1 to 1000 integrated roofing accessories. In some embodiments, there are 1 to 100 integrated roofing accessories. In some embodiments, there are 1 to 50 integrated roofing accessories. In some embodiments, there are 1 to 25 integrated roofing accessories. In some embodiments, there are 1 to 10 integrated roofing accessories. In some embodiments, there are 1 to 5 integrated roofing accessories. In some embodiments, there are 1 to 2 integrated roofing accessories.

In some embodiments, there are 2 to 10,000 integrated roofing accessories. In some embodiments, there are 5 to 10,000 integrated roofing accessories. In some embodiments, there are 10 to 10,000 integrated roofing accessories. In some embodiments, there are 50 to 10,000 integrated roofing accessories. In some embodiments, there are 100 to 10,000 integrated roofing accessories. In some embodiments, there are 500 to 10,000 integrated roofing accessories. In some embodiments, there are 1000 to 10,000 integrated roofing accessories. In some embodiments, there are 5000 to 10,000 integrated roofing accessories.

In some embodiments, there are 2 to 5000 integrated roofing accessories. In some embodiments, there are 5 to 1000 integrated roofing accessories. In some embodiments, there are 10 to 5000 integrated roofing accessories. In some embodiments, there are 50 to 100 integrated roofing accessories. In some embodiments, there are 60 to 90 integrated roofing accessories. In some embodiments, there are 70 to 80 integrated roofing accessories.

In some embodiments, the at least one integrated roofing accessory may include at least one electronic component embedded within at least one roofing accessory component.

Non-limiting examples of the at least one electronic component of the at least one integrated roofing accessory include: at least one antenna, at least one solar array, at least one battery, at least one computing device, at least one controller, at least one processor, the like, or any combination thereof. The at least one electronic component may also include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Additional examples of electronic components can be found in US Patent Application Publication No. 2019/0123679.

FIG. 1 depicts a non-limiting exemplary embodiment of an integrated roofing accessory described herein. In the non-limiting exemplary embodiment, the integrated roofing accessory 11 may be in a form of frame that may include at least one cover 18, and at least one computing module 20, jointly referenced herein as the frame components. In some embodiments, the frame components may also include a front edge portion 14, a right edge portion 16, a left edge portion 17 and a back-edge portion (not shown). Together, the front edge portion 14, the right edge portion 16, the left edge portion 17 or back edge portion may form a frame to carry or enclose the cover 18 and computing module 20. In some embodiments, the combination of the frame, the cover 18 and the computing module 20 may form the integrated roofing accessory 11 that may be installed on a roof as a unit with or without additional integrated roofing accessories.

In some embodiments, the front edge portion 14, the right edge portion 16, the left edge portion 17 or back edge portion may be separately attachable to each other, to the cover 18, or both. However, in some embodiments, the front edge portion 14, the right edge portion 16, the left edge portion 17 or back edge portion are all fixed to each other, such as by being integrally formed together, fastened together with a suitable fastener (e.g., bolt, screw, rivet, pin, etc.), connected via an adhesive, or by some other method. The frame of the integrated roofing accessory 11 may then carry the cover 18 and/or computing module 20. In some embodiments, the frame components may be made of any material. In some embodiments, the frame components include at least one of molded or extruded plastic, aluminum, a polymer composite material, the like, or any combination thereof.

In some embodiments, each of the cover 18, computing module 20 and any other frame components may be integrally formed, e.g., by, for example, without limitation, molding or cutting the computing module 20 into a material, such as, e.g., roofing material (e.g., a polymer or other suitable roofing material). Thus, the electronics of the computing module 20 as well as the attachment mechanisms of the front edge portion 14, the right edge portion 16, the left edge portion 17 or back edge portion may be embedded into the material.

Figure 2:
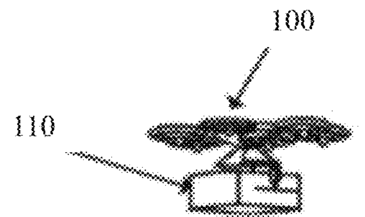
FIG. 2 depicts a non-limiting embodiment depicting the attachment of the integrated roofing accessory of FIG. 1 to a roof.
Figure 2:
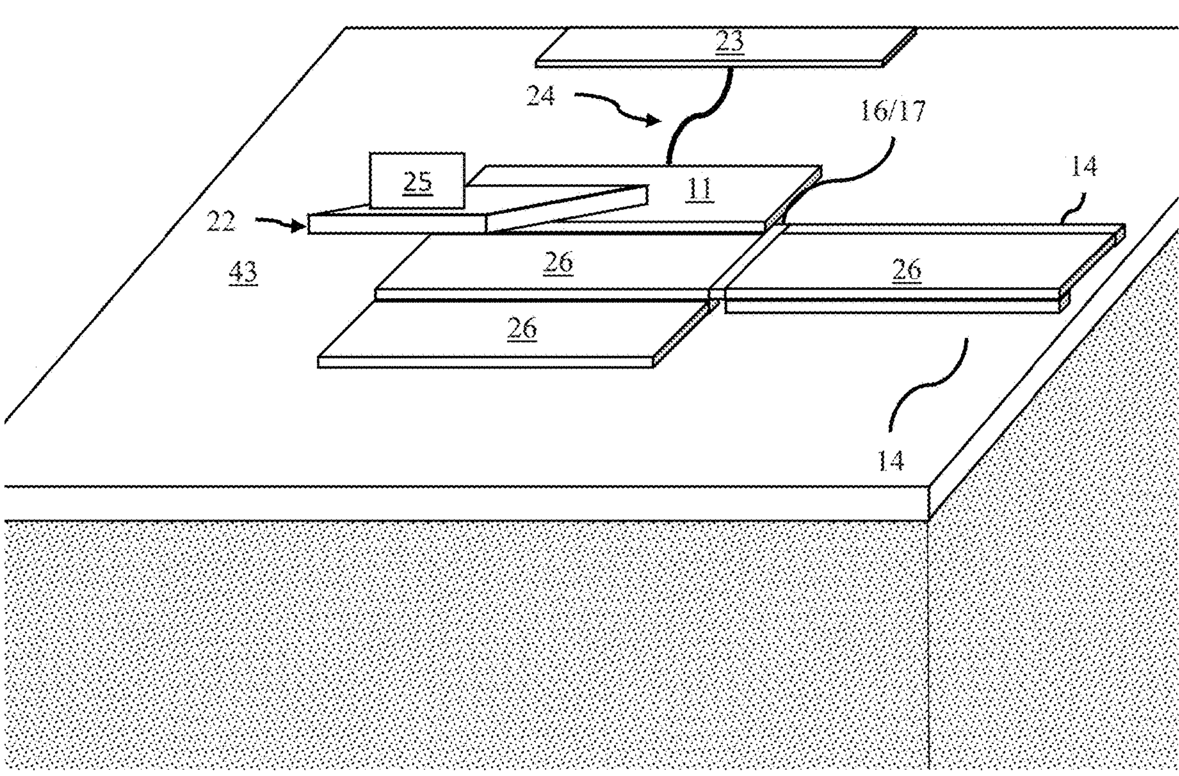

In some embodiments, the front edge portion 14, the right edge portion 16, the left edge portion 17 or back edge portion, or a combination thereof may be fixed to the cover 18 or removably attached. Moreover, as shown in FIG. 2, one or more roofing accessories 11 can be joined via one or more frame components (for example, without limitation, by one or more attachment mechanisms on the front edge portion 14, the right edge portion 16, the left edge portion 17 or back edge portion, or a combination thereof). For example, integrated roofing accessories 11 may be removable joined among themselves and/or removably joined to other roofing accessories and components, such as shingles, waterproofing membranes, underlayment, tiles, photovoltaic panels, among other suitable roofing accessories and components to cover a roof via, for example, without limitation, suitable mating mechanisms on one or more frame components (e.g., the cover 18) Various additional examples of the frame components that may be utilized to build and/or join the integrated roofing accessories 11 among themselves or to other roofing accessories, and their arrangements are disclosed in U.S. Pat. No. 9,169,646 which issued on Oct. 27, 2015; U.S. Pat. No. 9,273,885 which issued on Mar. 1, 2016; and U.S. Pat. No. 10,256,765 which issued on Apr. 9, 2019, all of which are incorporated herein by reference in their entirety for such specific purposes.

In some embodiments, the at least one computing module 20 includes at least one electronic component 21, which may be mounted to or recessed in the top surface of roof and mounted to or embedded into an underside of the cover 18. In some embodiments, cover 18 may be covered with a protective material chosen from at least one of, a polymer, an epoxy, the like, or combinations thereof. In some embodiments, the frame components may also include at least one additional computing module (not shown), which may include at least one second electronic component and wiring to electrically connect the integrated roofing accessory 11 to additional roofing accessories and infrastructure (e.g., power source, photovoltaic panels, additional integrated roofing accessories 11, etc.). For example, one or more the frame components may be formed with a data bus or data bussed to enable electronic communication with mating busses of adjacent and/or attached additional roofing accessories. As such, electronic components 21 may interconnect with electronic components in other roofing accessories to create a system of interconnect roofing accessories.

In some embodiments, the cover 18 and computing module 20 form a modified photovoltaic module of the integrated roofing accessory 11. For example, the modified photovoltaic module may have a photovoltaic panel employed as the cover 18. In some embodiments, the modified photovoltaic module includes a frame constructed from the frame components, and the electronic components 21 included within the computing module 20. In some embodiments, computing module 20 may be integrated into the photovoltaic panel, when such is utilized as the cover 18, or in one or more of the front edge portions 14, the right edge portion 16, the left edge portion 17 or back edge portion of the frame components. In some embodiments, the computing module 21 may be an additional compartment enclosed within the integrated roofing accessory 11 (e.g., enclosed by one or more framing components (e.g., the cover 18)).

In some embodiments, the modified photovoltaic module may include a photovoltaic panel (as the cover 18), that may be modified to collocate antennae with the photovoltaic panel, e.g., without limitation, by placing one or more antenna elements between photovoltaic cells of the photovoltaic panel, placing one or more antenna elements over or under photovoltaic cells of the photovoltaic panel, integrating antenna elements into the photovoltaic cells of the photovoltaic panel, or by another suitable technique. Accordingly, a radio of the electronic components 21 may emit unmanned vehicle navigation signals via the photovoltaic panels using the collocated antennae.

In some embodiments, the integrated roofing accessory 11 may emit unmanned vehicle navigation signals using one or more antennae integrated into the cover 18. For example, a dielectric antenna may be embedded in a polymer sized to cover one or more frame components such as, without limitation, the computing module 20. In some embodiments, the dielectric antenna may be a patch antenna, or other suitable antenna for embedding in the cover 18 such that the cover 18 may form an antenna module covering the electronic components 21 of the integrated roofing accessory 11. As a result, the cover 18 may serve as both a roofing accessory to weatherproof a roof of a house, as well as an antenna for an unmanned vehicle navigation network, as described below.

In some embodiments, the at least one integrated roofing accessory 11 may include electronic components 21 including a communication module that is configured to allow unmanned vehicle navigation signals to be transmitted. In some embodiments, the at least one integrated roofing accessory 11 may include electronic components 21 including a communication module that is configured to allow unmanned vehicle navigation signals to be received. In some embodiments, the at least one integrated roofing accessory 11 may include electronic components 21 including a communication module that is configured to allow unmanned vehicle navigation signals to be transmitted and received.

In some embodiments, the at least one integrated roofing accessory is configured to allow electromagnetic signals to be transmitted. In some embodiments, the at least one integrated roofing accessory is configured to allow electromagnetic signals to be received. In some embodiments, the at least one integrated roofing accessory is configured to allow electromagnetic signals to be transmitted and received. In some embodiments, the electromagnetic signals facilitate navigation of unmanned vehicles. In some embodiments the electromagnetic signals that facilitate navigation of unmanned vehicles through the global positioning system (GPS).

In some embodiments, the at least one integrated roofing accessory includes at least one embedded antenna. In some embodiments, the at least one embedded antenna is configured to perform at least one of the following operations: receiving electromagnetic signals (e.g., GPS signals), transmitting electromagnetic signals (e.g., GPS signals), or any combination thereof.

In some embodiments, the at least one integrated roofing accessory 11 includes at least one embedded antenna. As used herein, the term "antenna" or "antennae" can refer to a device that is part of a transmitting or receiving system to transmit or receive wireless signals. In some embodiments, the at least one embedded antenna is configured to perform at least one of the following operations: receiving electromagnetic waves (e.g., unmanned vehicle navigation signals), transmitting electromagnetic waves (e.g., unmanned vehicle navigation signals), or any combination thereof.

In some embodiments, the at least one integrated roofing accessory 11 is configured to support at least one signal propagation strategy. The at least one signal propagation strategy includes, but is not limited to, at least one of: many inputs-many outputs (MIMO), beam forming mesh, the like, or any combination thereof.

In some embodiments, the at least one embedded antenna is at least one dielectric antenna. In some embodiments, the at least one dielectric antenna takes the form of at least one dielectric antenna array. In some embodiments, the at least one dielectric antenna array includes a plurality of dielectric antennas configured to wirelessly receive a controllable beam in response to electromagnetic signals. In some embodiments, the at least one dielectric antenna array includes a plurality of dielectric antennas configured to wirelessly transmit a controllable beam in response to the electromagnetic signals. In some embodiments, the at least one dielectric antenna array includes a plurality of dielectric antennas configured to wirelessly transmit and receive a controllable beam in response to the electromagnetic signals.

In some embodiments, the dielectric antenna is embedded within the cover 18 or is covered by the cover 18 within the at least one computing module 20. Accordingly, the cover 18 may be constructed from a material that has a minimal effect on the unmanned vehicle navigation signals emitted by the dielectric antenna, such as a material that is transparent to unmanned vehicle navigation signals, thus causing sufficiently low attenuation for a stable data transmission or reception. For example, the cover 18 may include a polymer, including engineered polymers. In some embodiments, the dielectric antenna is mounted on an exterior surface of the integrated roofing accessory 11, e.g., on an exterior of the cover 18 relative to the at least one recessed computing module 20.

In some embodiments, the at least one integrated roofing accessory 11 includes at least one of: at least one computing device, at least one storage component, or at least one memory component. In some embodiments, the at least one integrated roofing accessory 11 is configured to dynamically carry out prescribed functions. In some embodiments, the at least one integrated roofing accessory 11 is configured to be controlled remotely by a network operator or administrator (e.g., an unmanned vehicle navigation network), such as in a software defined network 30 as described below with reference to FIG. 3A. In some embodiments, the at least one integrated roofing accessory 11 is configured to be controlled remotely by a wired connection. In some embodiments, the at least one integrated roofing accessory 11 includes a base configuration. In some embodiments, the at least one integrated roofing accessory 11 can be expanded from the base configuration.

Non-limiting examples of the at least one computing device include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like. Additional non-limiting examples of the at least one computing device include processors, microprocessors, circuits, circuit elements (e.g., transistors, resistors, capacitors, inductors, and so forth), integrated circuits, ASIC, PLD, DSP, FPGA, logic gates, registers, semiconductor device, chips, microchips, chip sets, and so forth. In some embodiments, the one or more processors may be implemented as a CISC or RISC processors; x86 instruction set compatible processors, multi-core, or any other microprocessor or CPU. In various implementations, the one or more processors may be dual-core processor(s), dual-core mobile processor(s), and so forth.

Non-limiting examples of the at least one storage component or the least one memory component include: read only memory (ROM); random access memory (RAM); magnetic disk storage media; optical storage media; flash memory devices; electrical, optical, acoustical or other forms of propagated signals (e.g., carrier waves, infrared signals, digital signals, etc.), or any combination thereof.

In some embodiments, a plurality of integrated roofing accessories described herein can be installed on a plurality of roofs, so as to create an unmanned vehicle navigation network (unmanned vehicle navigation network). In some embodiments, a plurality of integrated roofing accessories described herein can be installed on a single roof so as to create the unmanned vehicle navigation network.

In some embodiments, a method of using an unmanned vehicle navigation network described herein includes: providing a plurality of integrated roofing accessories as described herein; transmitting at least one electromagnetic signal (e.g., an unmanned vehicle navigation signal) from a first integrated roofing accessory; and receiving the at least one electromagnetic signal by a second integrated roofing accessory. In some embodiments, the second integrated roofing accessory further transmits the at least one electromagnetic signal to a third integrated roofing accessory, and so on. In some embodiments, the first integrated roofing accessory is located on a first building, the second integrated roofing accessory is located on a second building, the third integrated roofing accessory is located on a third building, and so on.

In some embodiments, in addition to or instead of the at least one embedded antenna, the at least one integrated roofing accessory 11 may include a visual indicator 18 or electronic indicator 19 to facilitate navigation of unmanned vehicles. For example, the visual indicator 18 may include, e.g., a Quick Response (QR) code, a bar code, a micro code, a location identification (e.g., longitude-latitude, address, etc.), or other visual marker to identify the location of the at least one integrated roofing accessory 11. For example, the electronic indicator 19 may include, e.g., an embedded radiofrequency identification (RFID) tag, an embedded near field communication (NFC) tag, or other electronic identification marker to identify the location of the at least one integrated roofing accessory 11.

In some embodiments, the at least one integrated roofing accessory 11 may comprise electronic indicator 19 including at least one embedded RFID tag. In some embodiments, the at least one embedded RFID tag may be utilized by at least one unmanned vehicle 100 to verify a location for delivering at least one parcel. For instance, in some non-limiting exemplary embodiments, an unmanned vehicle may deliver a parcel to a predetermined location. Upon arrival at the predetermined location, the unmanned vehicle may use an on-board RFID reader to scan the RFID, so as to determine whether the predetermined location is the correct location for delivery of the parcel. In some embodiments, the at least one RFID tag may be embedded into at least one roofing accessory component in the manner described by US Patent Application Publication No. 2018/0330218, attached hereto as Appendix D and incorporated by reference herein in its entirety.

In some embodiments, the integrated roofing accessory may include electronic indicator 19 including at least one embedded RFID reader. In some embodiments, the at least one embedded RFID reader may comprise the following non-limiting components: at least one embedded antenna described herein, at least one embedded battery described herein, at least one memory component described herein, the like, or any combination thereof. In some embodiments, the at least one RFID reader is configured to identify at least one unmanned vehicle 100. In some embodiments, the at least one RFID reader is configured to identify at least one parcel. In some embodiments, the at least one RFID reader is configured to track at least one unmanned vehicle 100. In some embodiments, the at least one RFID reader is configured to track at least one parcel. In some embodiments, the at least one RFID reader is configured to identify and track at least one unmanned vehicle 100. In some embodiments, the at least one RFID reader is configured to identify and track at least one parcel.

In some embodiments, the integrated roofing accessory described herein may include visual indicator 18 including at least one embedded bar code. While the embedded bar code may be any type of bar code, in some embodiments, the at least one embedded bar code is a quick response (QR) code.

In some embodiments, the display of the visual indicator 18 may be a fixed or static display, such as, e.g., a marking on the at least one integrated roofing accessory 11 using a suitable marking technique. For example, the visual indication may be formed from a substance formed on the at least one integrated roofing accessory 11, where the substance has a color that contrasts with a substrate including the at least one integrated roofing accessory 11. For example, the visual indicator 18 may be printed on a material having a solid color, and the material is adhered to the at least one integrated roofing accessory 11. In another example, the visual indicator 18 may be engraved into a top surface of the at least one integrated roofing accessory 11. Other forms of marking, such as forming on the top surface of the at least one integrated roofing accessory 11 a substance having a color different from the top surface of the at least one integrated roofing accessory 11 via, e.g., printing, painting, inking, depositing, forming from a tape or other adhered material, or by any other suitable technique.

In some embodiments, the display of the visual indicator 18 may be a dynamic display. For example, the at least one integrated roofing accessory 11 may have embedded or other otherwise integrated thereon an electronic display device, such as, e.g., a liquid crystal display (LCD), an organic light emitting diode (OLED) display, light emitting diode (LED) display, an eInk™ display, or other controllable display type. In some embodiments, the electronic display device may be installed on or in the at least one integrated roofing accessory 11 with a waterproof or water-resistant cover that is transparent.

In some embodiments, the integrated roofing accessory described herein may include the visual indicator 18 including at least one embedded bar code reader. While the embedded bar code reader may be configured to read any type of bar code associated with or formed on the at least one unmanned vehicle 100. In some embodiments, the at least one embedded bar code reader is configured to read QR codes. In some embodiments, the at least one embedded bar code reader may comprise the following non-limiting components: at least one embedded antenna described herein, at least one embedded battery described herein, at least one memory component described herein, the like, or any combination thereof. In some embodiments, the at least one bar code reader is configured to identify at least one unmanned vehicle 100. In some embodiments, the at least one bar code reader is configured to identify at least one parcel. In some embodiments, the at least one bar code reader is configured to track at least one unmanned vehicle 100. In some embodiments, the at least one bar code reader is configured to track at least one parcel. In some embodiments, the at least one bar code reader is configured to identify and track at least one unmanned vehicle 100. In some embodiments, the at least one bar code reader is configured to identify and track at least one parcel.

As shown in FIG. 2, the integrated roofing accessories 11 may be mounted onto a roof 43 using any suitable attachment mechanism such as fasteners (e.g., nails, screws, pins) and/or adhesives, or by attachment mechanisms mating to the attachment mechanisms of the frame components (left and right edge portions 16/17, front edge portion 14, and back edge portion (not shown)), such as the attachment mechanisms disclosed in U.S. Pat. Nos. 9,169,646, 9,273,885, and 10,256,765, incorporated by reference above. In some embodiments, the integrated roofing accessories 11 can be coated with asphalt before, during, or after installation. In some embodiments, the integrated roofing accessories 11 may be mounted on, under, or within one or more roofing materials. As used herein, the term "roofing material" includes, but is not limited to, shingles, waterproofing membranes, underlayment, tiles and photovoltaic panels.

In some embodiments, the left and right edge portions 16/17, front edge portion 14, and back edge portion (not shown) of the at least one roofing accessory 11 may contact left and right edge portions 16/17, front edge portion 14, and back edge portion (not shown) of an adjacent roofing accessory, such as, e.g., a solar panel, a shingle, at least one additional integrated roofing accessory or other roofing accessory 26. The contact may form a seal, and as a result, the at least integrated roofing accessory 11 and the other roofing accessory 26 may form a water shedding layer. However, in some embodiments, the contact may not form a watertight seal, and as a result, a water shedding layer may be provided on the roof 43 below the at least one integrated roofing accessory 11 and each other roofing accessory 26.

In some embodiments, the integrated roofing accessories 11 on the roof 43 may electrically communicate with each other wirelessly or via a wired connection routed through the side portions 16/17 (e.g., via a bus, as described above). Accordingly, in some embodiments, one integrated roofing accessory 11 on the roof 43 can be connected to a power source, such as, e.g., via wiring 24 to a connection in a ridge vent 23 or to some other power source connection. However, in some embodiments, each roofing accessory 11 may be separately connected to the wiring 24 to the ridge vent 23.

In some embodiments, the at least one integrated roofing accessory includes at least one of an embedded solar array, an embedded battery, or any combination thereof. In some embodiments, at least one of the embedded solar array, the embedded battery, or any combination thereof can dynamically supply power to at least one unmanned vehicle 100. In some embodiments, the embedded battery is configured to be charged by either the embedded solar array or the power source. In some embodiments, the embedded battery is configured to deliver direct current (DC) power to at least one unmanned vehicle 100. In some embodiments, the embedded battery is configured to deliver alternating current (AC) power to at least one unmanned vehicle 100.

In some embodiments, the integrated roofing accessory includes at least one power unit to provide power from the embedded solar array, embedded battery, power source or combination thereof. In some embodiments the at least one power unit may comprise various components configured to deliver power to at least one unmanned vehicle 100. The various components configured to deliver power to at least one unmanned vehicle 100 include but are not limited to: the at least one embedded battery, the at least one embedded solar array, or any combination thereof. In some embodiments, the at least one power unit includes a wireless connection or wired connector, where the wireless or wired connector is configured to provide power to at least one device. In some embodiments, the at least one device is an unmanned vehicle. In some embodiments, the at least one device is an unmanned aerial vehicle (UAV). In some embodiments, the wired connector is of a type configured to mate with a charging port on the unmanned vehicle.

In some embodiments, where the at least one power unit includes a wireless connection, the wireless connection may include a wireless charging technology to wirelessly transfer power from the at least one power unit to the at least one unmanned vehicle 100. For example, the wireless charging technology may include an inductive charging technology, such as, e.g., Qi™, SAE J2954 compliant wireless charging, AirFuel Alliance compliant wireless charging, ISO 15118 compliant wireless charging, or any other wireless charging technology. In some embodiments, the power unit may include, e.g., a suitable inductive coil according to the inductive charging technology. The inductive coil may be embedding in a surface of the at least one integrated roofing accessory 11 such that when the at least one unmanned vehicle 100 approaches or lands on the at least one integrated roofing accessory 11, power may be inductively transferred from the power unit to the at least one unmanned vehicle 100.

In some embodiments, the at least one integrated roofing accessory 11 may include at least one landing member 22 on which the at least one unmanned vehicle 100 may land, e.g., for temporary or long-term storage, parcel or other item delivery, charging, et cetera. In some embodiments, the at least one landing member 22 may include a beam or pole extending at a suitable angle from the at least one integrated roofing member. For example, the beam or pole may be vertical, horizontal, or at a suitable angle relative to vertical or horizontal. In some embodiments, the beam or pole may include a portion configured to mate with a portion of the at least one unmanned vehicle 100, such as an adapter or a shape to hold the at least one unmanned vehicle 100 while the at least one unmanned vehicle 100 is landed and stationary (e.g., deactivated).

In some embodiments, the at least one landing member 22 may include, e.g., a platform mounted to the at least integrated roofing accessory 11. The platform may be mounted directly to the at least on integrated roofing accessory 11 and extending from a surface on the at least one integrated roofing accessory 11. However, in some embodiments, the platform may be attached to the at least one integrated roofing accessory 11 via a member or other connection.

In some embodiments, the at least one landing member 22 may include at least one receptacle 25 mounted thereto. For example, the at least one receptacle 25 may be integral with the at least one landing member 22 or fastened to the at least one landing member 22. In some embodiments, the at least one receptacle 25 may include, e.g., a box, a basket, a hook, or other structure suitable for receiving/accepting at least one delivery item 110 carried by the at least one unmanned vehicle 100.

In some embodiments, the power unit may include a power delivery device on or in the at least one landing member 22. For example, the power delivery device may include a wire connector, such as, e.g., a power outlet, a universal serial bus (USB) connector, or other wired power connector that mates to a power connector of the at least one unmanned vehicle 100 for a transfer of power to the at least one unmanned vehicle 100. For example, the at least one embedded battery and/or the at least one inductive coil may be formed within the at least one landing member 22, such that upon landing on the at least one landing member 22, the at least one unmanned vehicle 100 may receive power delivered via the power delivery device.

In some embodiments, the at least one integrated roofing accessory includes at least one of: at least one computing device, at least one storage component, or at least one memory component. In some embodiments, the at least one integrated roofing accessory is configured to dynamically carry out prescribed functions. In some embodiments, the at least one integrated roofing accessory is configured to be controlled remotely by a network. In some embodiments, the at least one integrated roofing accessory is configured to be controlled remotely by a wired connection. In some embodiments, the at least one integrated roofing accessory includes a base configuration. In some embodiments, the at least one integrated roofing accessory can be expanded from the base configuration.

Non-limiting examples of the at least one storage component or the least one memory ROM; RAM; magnetic disk storage media; optical storage media; flash memory devices; electrical, optical, acoustical or other forms of propagated signals (e.g., carrier signals, infrared signals, digital signals, etc.), or any combination thereof.

In some embodiments, a single integrated roofing accessory described herein can be installed on a plurality of roofs, so as to create an integrated roofing accessory network. In some embodiments, a plurality of integrated roofing accessories described herein can be installed on a single roof so as to create an integrated roofing accessory network. In some embodiments, a plurality of integrated roofing accessories described herein can be installed on a plurality of roofs so as to create an integrated roofing accessory network.

In some embodiments, a non-limiting method of using an integrated roofing accessory network described herein includes: providing a plurality of integrated roofing accessories as described herein; transmitting at least one electromagnetic signal from a first integrated roofing accessory; and receiving the at least one electromagnetic signal by a second integrated roofing accessory. In some embodiments, the second integrated roofing accessory further transmits the at least one electromagnetic signal to a third integrated roofing accessory, and so on. In some embodiments, the first integrated roofing accessory is located on a first building, the second integrated roofing accessory is located on a second building, the third integrated roofing accessory is located on a third building, and so on.

In some embodiments, the integrated roofing accessory described herein can be incorporated into an integrated roofing system. In some embodiments, the integrated roofing system described herein may include a plurality of integrated roofing accessories on a single roof. In some embodiments, the integrated roofing system described herein may include a single integrated roofing accessory on a plurality of roofs. In some embodiments, the integrated roofing system described herein may include a plurality of integrated roofing accessories on a plurality of roofs.

In some embodiments, the integrated roofing system described herein can comprise at least one integrated roofing accessory described herein and at least one unmanned vehicle 100.

In some embodiments, the at least one unmanned vehicle 100 may include at least one antenna. In some embodiments, the at least one antenna is configured to receive electromagnetic signals. In some embodiments, the at least one antenna is configured to transmit electromagnetic signals. In some embodiments, the at least one antenna is configured to transmit and receive electromagnetic signals. In some embodiments, the electromagnetic signals are GPS signals.

In some embodiments, the at least one unmanned vehicle 100 is configured to be charged by the at least one power unit of the integrated roofing accessory described herein. In some embodiments, the at least one unmanned vehicle 100 may include at least one battery that is configured to be charged by the at least one power unit described herein.

In some embodiments, the integrated roofing system described herein can comprise at least one platform. In some embodiments, such as when the at least one unmanned vehicle 100 is a UAV, the at least one platform may provide a surface for the at least one unmanned vehicle 100 to dock. In some embodiments, the at least one platform forms a part of at least one integrated roofing accessory of the integrated roofing system. In some embodiments, the at least one platform forms a surface of at least one integrated roofing accessory of the integrated roofing system. In some embodiments, the integrated roofing system may be configured to allow the at least one unmanned vehicle 100 to charge (e.g., by using the at least one power unit described herein) while docking.

In some embodiments, the integrated roofing system described herein is configured to extend at least one route of the at least one unmanned vehicle 100 from 1 to 2500 miles longer than the at least one route of the at least one unmanned vehicle 100 without the integrated roofing system. In some embodiments, the integrated roofing system described herein is configured to extend at least one route of the at least one unmanned vehicle 100 from 1 to 2000 miles longer than the at least one route of the at least one unmanned vehicle 100 without the integrated roofing system. In some embodiments, the integrated roofing system described herein is configured to extend at least one route of the at least one unmanned vehicle 100 from 1 to 1500 miles longer than the at least one route of the at least one unmanned vehicle 100 without the integrated roofing system. In some embodiments, the integrated roofing system described herein is configured to extend at least one route of the at least one unmanned vehicle 100 from 1 to 1000 miles longer than the at least one route of the at least one unmanned vehicle 100 without the integrated roofing system. In some embodiments, the integrated roofing system described herein is configured to extend at least one route of the at least one unmanned vehicle 100 from 1 to 500 miles longer than the at least one route of the at least one unmanned vehicle 100 without the integrated roofing system. In some embodiments, the integrated roofing system described herein is configured to extend at least one route of the at least one unmanned vehicle 100 from 1 to 250 miles longer than the at least one route of the at least one unmanned vehicle 100 without the integrated roofing system. In some embodiments, the integrated roofing system described herein is configured to extend at least one route of the at least one unmanned vehicle 100 from 1 to 100 miles longer than the at least one route of the at least one unmanned vehicle 100 without the integrated roofing system. In some embodiments, the integrated roofing system described herein is configured to extend at least one route of the at least one unmanned vehicle 100 from 1 to 50 miles longer than the at least one route of the at least one unmanned vehicle 100 without the integrated roofing system. In some embodiments, the integrated roofing system described herein is configured to extend at least one route of the at least one unmanned vehicle 100 from 1 to 25 miles longer than the at least one route of the at least one unmanned vehicle 100 without the integrated roofing system. In some embodiments, the integrated roofing system described herein is configured to extend at least one route of the at least one unmanned vehicle 100 from 1 to 10 miles longer than the at least one route of the at least one unmanned vehicle 100 without the integrated roofing system. In some embodiments, the integrated roofing system described herein is configured to extend at least one route of the at least one unmanned vehicle 100 from 1 to 5 miles longer than the at least one route of the at least one unmanned vehicle 100 without the integrated roofing system.

In some embodiments, the integrated roofing system described herein is configured to extend at least one route of the at least one unmanned vehicle 100 from 5 to 2500 miles longer than the at least one route of the at least one unmanned vehicle 100 without the integrated roofing system. In some embodiments, the integrated roofing system described herein is configured to extend at least one route of the at least one unmanned vehicle 100 from 10 to 2500 miles longer than the at least one route of the at least one unmanned vehicle 100 without the integrated roofing system. In some embodiments, the integrated roofing system described herein is configured to extend at least one route of the at least one unmanned vehicle 100 from 25 to 2500 miles longer than the at least one route of the at least one unmanned vehicle 100 without the integrated roofing system. In some embodiments, the integrated roofing system described herein is configured to extend at least one route of the at least one unmanned vehicle 100 from 50 to 2500 miles longer than the at least one route of the at least one unmanned vehicle 100 without the integrated roofing system. In some embodiments, the integrated roofing system described herein is configured to extend at least one route of the at least one unmanned vehicle 100 from 100 to 2500 miles longer than the at least one route of the at least one unmanned vehicle 100 without the integrated roofing system. In some embodiments, the integrated roofing system described herein is configured to extend at least one route of the at least one unmanned vehicle 100 from 250 to 2500 miles longer than the at least one route of the at least one unmanned vehicle 100 without the integrated roofing system. In some embodiments, the integrated roofing system described herein is configured to extend at least one route of the at least one unmanned vehicle 100 from 500 to 2500 miles longer than the at least one route of the at least one unmanned vehicle 100 without the integrated roofing system. In some embodiments, the integrated roofing system described herein is configured to extend at least one route of the at least one unmanned vehicle 100 from 1000 to 2500 miles longer than the at least one route of the at least one unmanned vehicle 100 without the integrated roofing system. In some embodiments, the integrated roofing system described herein is configured to extend at least one route of the at least one unmanned vehicle 100 from 1500 to 2500 miles longer than the at least one route of the at least one unmanned vehicle 100 without the integrated roofing system. In some embodiments, the integrated roofing system described herein is configured to extend at least one route of the at least one unmanned vehicle 100 from 2000 to 2500 miles longer than the at least one route of the at least one unmanned vehicle 100 without the integrated roofing system.

In some embodiments, the integrated roofing system described herein is configured to guide an unmanned vehicle 100 to a predetermined location and deliver/transport at least one delivery item 110 to the predetermined location (e.g., a house). In some embodiments, the integrated roofing system described herein is configured to guide an unmanned vehicle 100 to land at the predetermined location. In some embodiments, the integrated roofing system described herein is configured to guide an unmanned vehicle 100 on at least one return route from the predetermined location to at least one delivery hub.

In some embodiments, the integrated roofing system described herein is configured to re-direct at least one route of an unmanned vehicle. In some embodiments where the unmanned vehicle is a UAV, the integrated roofing system may re-direct the route of the UAV in midair, without a need for the UAV to land.

In some embodiments, the integrated roofing system may provide an auxiliary navigation system for an unmanned vehicle. In one non-limiting example, the integrated roofing system may provide an auxiliary GPS if an on-board GPS of the unmanned vehicle fails. In another non-limiting example, the integrated roofing system may, based on access to local weather conditions, navigate the unmanned vehicle through inclement weather (e.g., rain, wind, sleet, snow, hurricanes, tornadoes, wildfires, earthquakes, the like, or any combination thereof). In some embodiments, an unmanned vehicle may require a remote manned operator. In such, embodiments, the auxiliary navigation system may provide backup for the unmanned vehicle in the event the remote manned operator is unavailable.

In some embodiments, the integrated roofing system may notify at least one user that the unmanned vehicle is arriving at the predetermined location.

In some embodiments, the integrated roofing system may notify at least one user that the unmanned vehicle is departing from the predetermined location.

In some embodiments the integrated roofing system may notify at least one user that the unmanned vehicle is approaching the predetermined location. In some embodiments, whether the unmanned vehicle is approaching the predetermined location is determined by whether the unmanned vehicle is at a distance that is less than or equal to a threshold distance from the predetermined location. In some embodiments, the threshold distance is 1 to 10,000 feet. In some embodiments, the threshold distance is 10 to 10,000 feet. In some embodiments, the threshold distance is 50 to 10,000 feet. In some embodiments, the threshold distance is 100 to 10,000 feet. In some embodiments, the threshold distance is 1000 to 10,000 feet. In some embodiments, the threshold distance is 5000 to 10,000 feet. In some embodiments, the threshold distance is 1 to 5000 feet. In some embodiments, the threshold distance is 1 to 5000 feet. In some embodiments, the threshold distance is 1 to 1000 feet. In some embodiments, the threshold distance is 1 to 500 feet. In some embodiments, the threshold distance is 1 to 100 feet. In some embodiments, the threshold distance is 1 to 10 feet.

In some embodiments, the integrated roofing system is configured to notify at least one user that the unmanned vehicle has cleared a roof of the predetermined location. In some embodiments, whether the unmanned vehicle has cleared the roof of the predetermined location is determined by whether the unmanned vehicle is at a that is greater than or equal to a threshold distance from the roof of predetermined location. In some embodiments, the threshold distance is 1 to 10,000 feet. In some embodiments, the threshold distance is 10 to 10,000 feet. In some embodiments, the threshold distance is 50 to 10,000 feet. In some embodiments, the threshold distance is 100 to 10,000 feet. In some embodiments, the threshold distance is 1000 to 10,000 feet. In some embodiments, the threshold distance is 5000 to 10,000 feet. In some embodiments, the threshold distance is 1 to 5000 feet. In some embodiments, the threshold distance is 1 to 5000 feet. In some embodiments, the threshold distance is 1 to 1000 feet. In some embodiments, the threshold distance is 1 to 500 feet. In some embodiments, the threshold distance is 1 to 100 feet. In some embodiments, the threshold distance is 1 to 10 feet.

In some embodiments where the unmanned vehicle is a UAV, the threshold distance used to determine whether the unmanned vehicle has cleared the roof of the predetermined location may be a threshold altitude.

In some embodiments where the integrated roofing system is on a residential roof, the at least one user may include at least one of: a homeowner, a landlord, a tenant, or any combination thereof. In some embodiments where the integrated roofing system is on a commercial roof, the at least one user may include at least one of property manager, a commercial tenant, or any combination thereof. In some embodiments, the at least one user may include an operator of a parcel delivery service. In some embodiments, the at least one user may include a recipient of a parcel from any parcel delivery service described herein.

In some embodiments the at least one user may be notified through Short Message Service (SMS). In some embodiments, the at least one user may be notified through Multimedia Message Service (MMS). In some embodiments, the at least one user may be notified through instant message. In some embodiments, the at least one user may be notified through email. In some embodiments the at least one user may be notified through at least one home automation system (i.e., at least one "smart home").

In some embodiments the integrated roofing system may include a diagnostic and repair station for the at least one unmanned vehicle 100. In some embodiments, the integrated roofing system can supply remote storage for cargo of the at least one unmanned vehicle 100. In some embodiments, the integrated roofing system is configured to secure payload of the at least one unmanned vehicle 100.

Figure 3A:
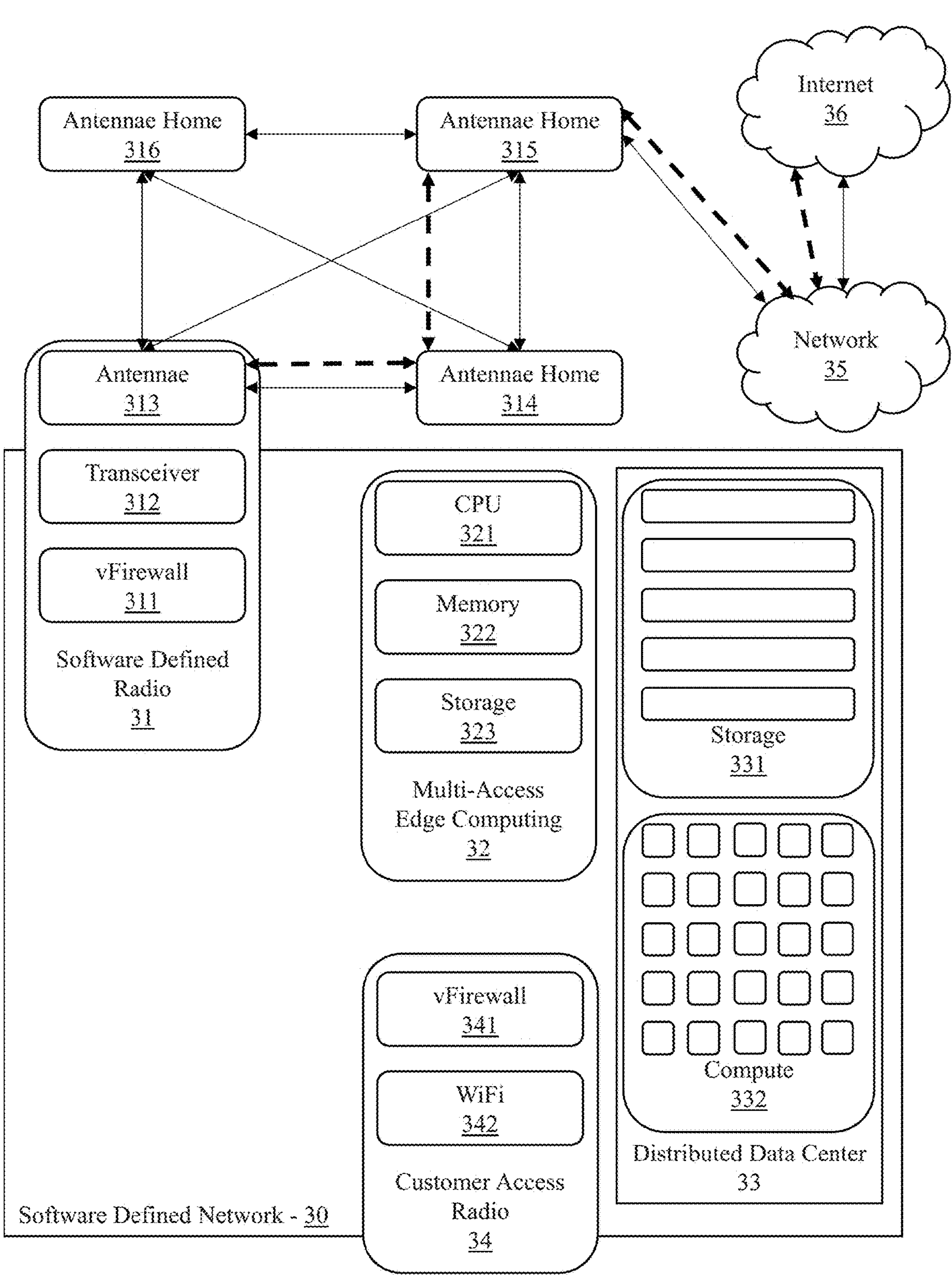
FIGS. 3A and 3B depict non-limiting embodiments depicting schematics of a network employing antennae integrated into the integrated roofing accessory of FIG. 1.

FIG. 3A depicts a networking model incorporating an integrated roofing accessory 11 according to aspects of embodiments of the present description.

In some embodiments, the unmanned vehicle navigation network may be configured to utilize Open Systems Interconnection (OSI) model, utilizing a framework of standards for communication between different systems manufactured by different vendors, to communicate between integrating roofing accessories and other devices and/or systems (e.g., wireless carrier network, home network, etc.). The OSI model creates an open systems networking environment where any vendor's computer system, connected to any network, freely shares data with any other computer system on that network, or on a linked network.

Typically, the OSI model organizes the communication process into seven different layers of interrelated protocols in a layered sequence. Layers 1 through 3 define network access protocols and Layers 4 through 7 deal with end-to-end communication protocols between a message source and a message destination. Each layer includes at least one function that is within an upper and a lower logical boundary. The services of each layer are combined with the services of lower layers to create new services that are made available to the higher layers. The layers include:

a. Layer 1 is a physical layer that responsible for the transmission and reception of unstructured raw data between a device and a physical transmission medium, including converting the digital bits into electrical, radio, or optical signals, with layer specifications defining characteristics such as voltage levels, the timing of voltage changes, physical data rates, maximum transmission distances, modulation scheme, channel access method and physical connectors;

b. Layer 2 is a data link layer that provides node-to-node data transfer via a link between two directly connected nodes, including detecting detects, and possibly correcting, errors that may occur in the physical layer, with definitions of the protocol to establish and terminate a connection between two physically connected devices, and the protocol for flow control between them;

c. Layer 3 is a network layer that provides the functional and procedural means of transferring variable length data sequences (called packets) from one node to another connected in "different networks" for routing and switching functions;

d. Layer 4 is a transport layer utilizing layers 1 to 3 to provide an end-to-end service having required characteristics for the higher layer functions, including the functional and procedural means of transferring variable-length data sequences from a source to a destination host, while maintaining the quality of service functions;

e. Layer 5 is a session layer that controls the dialogues (connections) between computers to provide the means to establish a session connection and to support an orderly exchange of data and related control functions for a particular communication service;

f. Layer 6 is a presentation layer that provides means for data formatting and code conversion to map the syntax and semantics to communication between application layer entities; and g. Layer 7 is an application layer that interacts with software applications that implement a communicating component, the protocols of which provide the actual service sought by an end user.

In some embodiments, the set-up of the exemplary unmanned vehicle navigation network in accordance with present disclosure may include software modules or combination software and hardware modules forming software-defined radio (SDR) 31 that include software that executes and assembles OSI layers 3-7 and transmission hardware (e.g., antennae 313 and transceivers 312) that execute OSI layers 1-2, or combinations of software and hardware.

In some embodiments, the integrated roofing accessories 11 may include hardware-based radio modules for interfacing with an unmanned vehicle navigation network. The radio modules may include circuitry for each of, e.g., amplifying, filtering, mixing, attenuating, etc. However, in some embodiments, the integrated roofing accessories employ SDR 31 modules. An SDR 31 module can be formed from hardware including a general-purpose processing device with software-based virtual signal processing components for amplifying, filtering, mixing, attenuating, etc. to produce the SDR 31 through virtual means.

In some embodiments, a basic SDR 31 module may include a processing device (e.g., CPU or GPU) equipped with an analog-to-digital converter, preceded by some form of RF front end. In some embodiments, the RF front end includes antennae 313 (e.g., one or more dielectric antennae or other suitable antenna types) and a transceiver 312. Significant amounts of signal processing are handed over to the general-purpose processor, rather than being done in special-purpose hardware (electronic circuits). Such a design produces a radio which can receive and transmit widely different radio protocols based solely on the software used.

In some embodiments, Layer 1 of a software defined network 30 according to the OSI model layers can include the physical components of the integrated roofing accessories 11 and respective SDR 31 modules. In some embodiments, such physical components may include, e.g., one or more antennae 313. Each integrated roofing accessory 11 on each building may include physical antennae 314-316 to form a network 35 of integrated roofing accessories 11 installed as roofing accessories throughout an area.

As described above, to improve signal density and signal number, as well as maximize the number of concurrent connections, the antennae 313 may include antenna elements positioned on a roof of a structure, such as house or building. In some embodiments, the antenna elements may be configured for unmanned vehicle navigation signaling via, e.g., a suitable signaling technology, e.g., 5G cellular, 4G, cellular, 3G cellular, WiFi, Bluetooth, Ultra-Wide Band, or other connectivity technology and combinations thereof.

In particular, in some embodiments, the integrated roofing accessories 11 may employ Layer 1, or physical, components including antennae 313 to provide an uplink and downlink signal transmission method for random access, channel measurement, and terminal feedback including unlicensed, licensed shared and extremely high frequency (EHF) bands, as well as any other functionalities over suitable frequency bands.

In some embodiments, to decrease propagation loss of the radio waves and increase the transmission distance, the beamforming, massive multiple-input multiple-output (MIMO), full dimensional MIMO (FD-MIMO), array antenna, an analog or digital beam forming, or other signal propagation enhancements, and combinations thereof. Accordingly, the integrated roofing accessories 11 may include antennae 313 that incorporate such MIMO, FD-MIMO, array, beamforming and other technologies for improved unmanned vehicle signal propagation.

In some embodiments, such integrated roofing accessories 11 employ physical antennae 313 to facilitate development of advanced small cells, cloud radio access networks (RANs), ultra-dense networks, device-to-device (D2D) communication, wireless backhaul, moving network, cooperative communication, coordinated multi-points (COMP), reception-end interference cancellation and the like. In a networking system, such as one formed by the network 35 of the integrated roofing accessories 11 (and, optionally, additional network-enabled devices and systems), Orthogonal Frequency Division Multiplexing (OFDM), hybrid frequency shift keying (FSK), quadrature amplitude modulation (QAM) (FQAM) and sliding window superposition coding (SWSC) may be employed individually or in combination as advanced coding modulation (ACM). In some embodiments, filter bank multi carrier (FBMC), non-orthogonal multiple access (NOMA), and sparse code multiple access (SCMA) as an advanced access technology may be incorporated instead or in addition.

Accordingly, in some embodiments, the antennae 313 may include multi-element antenna arrays, which may comprise very small elements, with sizes on the scale of integrated-circuit (IC) chip elements. Use of these multi-element antenna arrays may provide large antenna gain and sufficient power output through over-the-air power combining. This combination of large bandwidths and device architectures may allow antennae 313 to provide peak rates on the order of 10 Gbps and to provide ample capacity to meet the future demands.

However, in some embodiments, the unmanned vehicle navigation signals may experience power loss due to attenuation of radio waves, limiting the transmission distance. Thus, in some embodiments, beamforming may be employed to overcome the limitation of short transmission distance. With beamforming, transmission power can be concentrated in a specific direction according to the configuration of a transmitting antennae 313. When receiving, the antennae 313 may also enhance performance in a specific direction with beamforming. Beamforming (or spatial filtering) is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity In some embodiments, the antenna elements of the antennae 313 may be controllable for MIMO signaling. In radio, multiple-input and multiple-output, or MIMO, is a method for multiplying the capacity of a radio link using multiple transmission and receiving antennas to exploit multipath propagation. The MIMO is a space-time signal processing where a natural dimensional of transmitting data is complemented with a spatial dimension inherent in the use of multiple spatially distributed antennas. MIMO is able to turn multipath propagations into a benefit because signals on the transmit antennas at one end and the receiver antennas at the other end are integrated such that a quality of bit error rate (BER) or a data rate of the communication for each wireless user or a transmitting distance is improved, thereby increasing a communication network's quality of service.

A MIMO channel contains many individual radio links, hence it has Nt×Nr SISO (Single-Input Single-Output) channels (also called sub-channels), where Nt refers to a number of transmit channels, and Nr refers to a number of receive channels. For example, a 2×2 MIMO arrangement contains 4 links and hence 4 SISO channels. The SISO channels can be combined in various ways to transmit one or more data streams to the receiver. Thus, the antenna elements may be separate, individually controllable antennae 313, or sub-elements of a single antennae 313, or a combination thereof, that together may communicate data. In some embodiments, the antennae 313 may include MIMO signaling capabilities include, e.g., 2×2, 4×4, 6×6, 8×8 or more SISO channels. For example, the antennae 313 may include, e.g., phased array antennae for MIMO and microwave signal generation, including, loop and/or patch antenna elements integrated into a printed circuit board (PCB) and embedded in the integrated roofing accessory 11. One embodiment the antenna package may a high-density interconnected (HDI) FR-4 printed circuit board (PCB) substrate, or other suitable antenna array having a size to fit within the integrated roofing accessory 11 described above.

In some embodiments, the antennae 313 may be configured to emit unmanned vehicle navigation signals via, e.g., 5G, 4G, Long-Term Evolution (LTE), or 4G, Global System for Mobile Communications (GSM), Enhanced Data Rates for Global Evolution (EDGE), Universal Mobile Telecommunications System (UMTS), High Speed Packet Access (HSPA), Worldwide Interoperability for Microwave Access (WiMAX), Evolved HSPA (HSPA+), Carrier Division Multiple Aggregation (CDMA) frequencies. For example, 4G frequencies may have better range and penetration for reduced signal blockage and dissipation, thus improving long range stability, while 5G technologies, such as millimeter wave (mmWave), may have high bandwidth but reduced range. Alternatively, or in addition, the antennae 313 may be configured to communicate via relatively shorter range WiFi or Bluetooth frequencies, or any other suitable networking communication technology (e.g., Z-Wave, ZigBee, Ultra-Wide Band, et cetera).

In some embodiments, the antennae 313 may be positioned in a location to provide the best line-of-sight to both other antennae 314 through 316 as well as other computing devices. Both height and orientation may play in a role in providing line-of-sight to other devices, with a high location facilitating raising the antennae 313 above potential obstructions. Accordingly, as described above, installation as a roofing accessory on residential or commercial roof may provide positioning for facilitating mesh networking with additional antennae 314 through 316 as well as unmanned vehicle navigation signaling for data transmission to and from the at least one unmanned vehicle 100.

In some embodiment, the antennae 313 may require power to operate, and sometime significant amount of power. Indeed, greater power supply may improve signal propagation, or distance with which a signal may maintain throughput and stability. Installation as a roofing accessory facilitates providing roof-mounted photovoltaic panels or mains power, e.g., via a ridge vent or other similar access structure.

In some embodiments, Layer 2 components in a module of the SDR 31 and software defined network 30 can include data link components such as, e.g., a receiver, transmitter, transceiver 312 or combination thereof. In some embodiments, the transceiver 312 may be included in the electronic devices of the integrated roofing accessory 11 to control the antennae 313 for frequency control and modulation of emitted signals. Such a transceiver 312 may be selected or configured to balance complexity of signals and density or number of concurrent connections or channels with computational complexity, heat and size. In some embodiments, these factors may be balanced to achieve an optimal balance that maximizes signal complexity and number of concurrent connections while maintaining a size and heat output that is sustainable within an integrated roofing accessory 11.

Similarly, cost and circuit complexity/heat output may be balanced against power supply and amplitude of the antennae 313. As more power is supplied, the transceiver 312 may generate more heat and consume more energy, but signal propagation may be extended. Additionally, a higher quality, more sensitive and complex transceiver 312 may improve signal-to-noise ratios for better signal stability and data transmission.

In some embodiments, the transceiver 312 plays an active role in the SDR 31 by effectuating at least four sub-layers to the OSI Model Layer 2, including, e.g., Service Data Adaptation Protocol (SDAP), Packet Data Convergence Protocol (PDCP), Radio Link Control, Medium Access Control, among others.

The medium access control (MAC) sublayer is the layer that controls the hardware responsible for interaction with the wired, optical or wireless transmission medium. The MAC sublayer and the logical link control (LLC) sublayer together make up the data link layer. Within the data link layer, the LLC provides flow control and multiplexing for the logical link (i.e. EtherType, 802.1Q VLAN tag etc.), while the MAC provides flow control and multiplexing for the transmission medium.

Accordingly, in some embodiments, the transceiver 312 controls the antennae 313 for efficient transmission via, e.g., beamforming and MIMO functionality as described above. A beamforming protocol, such as that defined as part of the proposed IEEE 802.11 ad/WiGig standard, may be used to find a path between a cooperating pair of transmitter and receiver antennas.

In some embodiments, the transceiver 312 may include a selection from transceivers and/or modems integrated or embedded in integrated circuit or system-on-chip design. For example, a modem, such as a Qualcomm Snapdragon™ modem, Analog Devices Inc. modem, or other suitable modem and transceiver solutions suitable to be integrated into an integrated roofing accessory 11 for an SDR 31.

In some embodiments, the antennae 313 and 312 may be packaged in, e.g., an embedded solution, such as a system-on-chip architecture, however other integrate circuit packaging methodologies may be employed to package the antennae 313 and transceiver 312 under the cover 18 in a computing module 20 as the first electronic device and/or the at least one second electronic device 21. In some embodiments, the antennae 313 are separate from the transceiver 312 and in electronic communication with each via, e.g., copper wiring, or other wiring solution, or via a standardized data interface such as, e.g., PCIe, SATA, NVME, USB, ethernet, Registered Jack (e.g., RJ11), or other data communication interface, such as the wiring 22.

In some embodiments, as a separate electronic device or integrated into the system-on-chip of the transceiver 312, the SDR 31 may optionally include a virtual firewall (vFirewall) 311. In some embodiments, the vFirewall 311 may regulate data communication between the transceiver 312 and the software defined network 30 to prevent untrusted or unauthorized data, files, programs, scripts and other information from harming the software defined network 30 and software and hardware components therein.

In some embodiments, the vFirewall 311 may include a network firewall service or appliance running entirely within a virtualized environment and which provides the usual packet filtering and monitoring provided via a physical network firewall. The vFirewall 311 can be realized as a traditional software firewall on a guest virtual machine already running, a purpose-built virtual security appliance designed with virtual network security in mind, a virtual switch with additional security capabilities, or a managed kernel process running within the host hypervisor.

In some embodiments, the vFirewall 311 may operate in different modes to provide security services, depending on the point of deployment. For example, the vFirewall 311 may operate in either bridge-mode or hypervisor-mode. Both may include a virtual security appliance and may install a virtual machine for management purposes.

A virtual firewall operating in bridge-mode acts like its physical-world firewall analog; it sits in a strategic part of the network infrastructure—usually at an inter-network virtual switch or bridge—and intercepts network traffic destined for other network segments and needing to travel over the bridge. By examining the source origin, the destination, the type of packet it is and even the payload the VF can decide if the packet is to be allowed passage, dropped, rejected, or forwarded or mirrored to some other device. Initial entrants into the virtual firewall field were largely bridge-mode, and many offers retain this feature.

By contrast, a virtual firewall operating in hypervisor-mode is not actually part of the virtual network at all, and as such has no physical-world device analog. A hypervisor-mode virtual firewall resides in the virtual machine monitor or hypervisor where it is well positioned to capture VM activity including packet injections. The entire monitored VM and all its virtual hardware, software, services, memory and storage can be examined, as can changes in these. Further, since a hypervisor-based virtual firewall is not part of the network proper and is not a virtual machine its functionality cannot be monitored in turn or altered by users and software limited to running under a VM or having access only to the virtualized network.

In some embodiments, because the vFirewall 311 is positioned in the SDR 31 at the intersection between the software defined network 30 and other antennae 314 through 316 of a mesh unmanned vehicle navigation network, the vFirewall 311 may be configured to operate in bridge mode.

In some embodiments, as an SDR 31, the transceiver 312 and vFirewall 311 may be implemented as software components within a general-purpose processing device, such as, e.g., a CPU (e.g., an x86, x64, ARM, RISC-V, PowerPC, MIPS, SPARC, or other CISC or RISC processors), GPU, neural processing unit (NPU), FPGA, microprocessor, or other processing device or combinations thereof. In some embodiments, different functions of the transceiver 312 and vFirewall 311 may be configured to be implemented with separate processing components of processor package including multiple processing devices, processing or compute cores, or combinations thereof. For example, the processor package may include, e.g., one or more CPU cores, one or more GPU cores, one or more NPU cores, a digital-to-analog (DAC) converter, an analog-to-digital converter (ADC), a modem including radio-frequency receiver, transmitter and/or transceiver, cache, on chip storage, RAM, as well as data interfaces to interface with one or more additional processor devices, components or packages as well as to interface with the antennae 313 via the transceiver 312.

In some embodiments, the processing components of the SDR 31 may additionally be configured to integrate the SDR 31 into one or more networks, including the software defined network 30 and the network 35 such as a mesh unmanned vehicle navigation network incorporating additional antennae 314 through 316 from additional integrated roofing accessories 11 and the at least one unmanned vehicle 100 or any other computing device, as well as any other suitable network. Accordingly, the SDR 31 may cooperate with, e.g., the software defined network 30 to implement networking and communication protocol layers of the OSI Model. For example, such layers may include Layer 3 for networking, Layer 4 for transport and Layer 5 for session control and configuration. Such layers facilitated the SDR 31 to communicate with other antennae 314 through 316 even where the other antennae 314 through 316 are manufactured and programmed by different entities or using different software and firmware.

In some embodiments, the software defined network 30 implements layers 3 through 5 to establish a platform or standard network to integrate the SDR 31 into compute and communication resources. In some embodiments, the software defined network 30 implements the Layers 3 through Layer 5 to operate as a control layer for all communication between sub-systems or electronics modules of the software defined network 30 (including, e.g., the SDR 31 module), multi-access edge computing 32, distributed data components 33, consumer access radio 34 (e.g., WiFi, Bluetooth, Zigbee, Z-Wave, 4G/LTE, 5G (lite), 3G, etc.), among other sub-systems and electronics modules of the integrated roofing accessory 11 and devices in communication therewith.

In some embodiments, the software defined network 30 may integrate the sub-systems and electronics modules into a single system by defining the data traffic within the software defined network 30, e.g., using software-defined common resource management (SD-CRM). The SD-CRM can be used for networking functions and application/service functions. Thus, the SD-CRM can manage transport functions for layers zero through four as well as application functions for layers four and higher. The SD-CRM can provide a platform for network services, network control of service instantiation and management, as well as a programmable environment for resource and traffic management. The SD-CRM also can provide a consolidated network management interface to permit the combination of real time data from the service and network elements with real-time or near real-time control of the forwarding plane. Thus, embodiments of the concepts and technologies described herein can enable near real-time configuration and real-time flow setup, programmability through service and network script-like logic, extensibility for competitive differentiation, standard interfaces, and multi-vendor support, among other features. Interactions between these layers can be based upon policies to determine optimum configuration and rapid adaptation of the network to changing state and changing customer requirements for example, spikes in traffic, network outages (e.g., due to snow storms, blackouts, natural disasters, or the like), adding new services (e.g., VoIP/web RTC, authentication, etc.), maintenance, combinations thereof, or the like.

Accordingly, in some embodiments, the SD-CRM may define what communication will run over each SDR 31 module on the software defined network 30 (e.g., the SDR 31, the customer access radio 34, among others). In some embodiments, the software defined network 30 may extend to additional integrated roofing accessories 11 to incorporate the SDRs therein into a common software defined network 30. As a result, the SD-CRM may control traffic between the various SDRs 31 of the various integrated roofing accessories 11 to form a distributed computing environment for control of multiple SDR 31 modules to cooperate within a cohesive unmanned vehicle navigation network. Thus, multiple integrated roofing accessories 11 may be combined to create a larger antenna structure, facilitating modular functionality. In some embodiments, once an unmanned vehicle navigation network is created, the SD-CRM defines the traffic that traverses it.

Figure 3B:
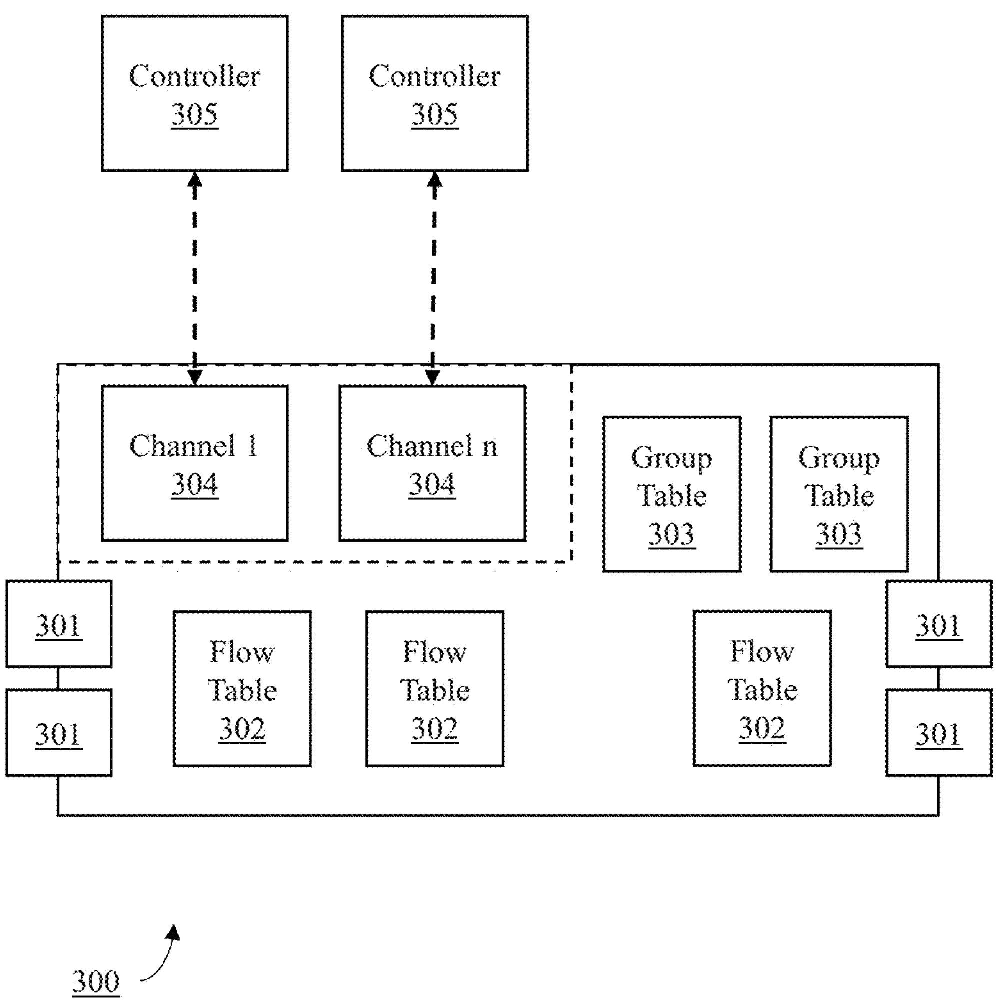

In some embodiments, the SD-CRM of the software defined network 30 may be implemented with, e.g., a network switch 300 as shown in FIG. 3B. In some embodiments, the network switch 300 may be configured to manage a software defined network 30 according to a network protocol, such as, e.g., the OpenFlow protocol, Accordingly, the network switch 300 may be a software defined (e.g., logical) switch protocol defined by one or more controllers 305. In some embodiments, however, the switch 300 may be a hardware switch or embodied in a specialized hardware device, such as, e.g., a single or multiport Ethernet switch (e.g., a Zodiac FX™ or other similar Ethernet switch), or other network switch device or devices.

In some embodiments, the network switch 300 may include one or more flow tables 302 and group tables 303, which perform packet lookups and forwarding, and one or more channels 304 to the external controller or controllers 305. The switch 300 communicates with the controllers 305 and the controllers 305 manage the switch 300 via the switch protocol by, e.g., adding, updating and deleting flow entries in flow tables 302.

In some embodiments, the switch 300 includes multiple flow tables 303. Thus, upon receiving packets of network traffic via one or more of the ports 301, the packets are compared in to entries in each flow table 302 starting with the first flow table and may continue to additional flow tables of the pipeline. The packet may first start in a table 0 and check those entries based on priority. Highest priority will match first (e.g. 200, then 100, then 1). If the flow needs to continue to another table, the packet may be advanced to the table specified in the instructions until a match is found, and the corresponding instructions are executed.

In some embodiments, the ports 301 may include physical and/or logical ports. Examples of hardware ports may include, e.g., ethernet interfaces, while logical ports may include, e.g., LGs, tunnels, loopbacks and other logical interfaces.

Referring again to FIG. 3A, the software defined network 30 may include the incorporation of data storage and compute resources. For example, a multi-access edge computing (MEC) 32 system may be employed in each integrated roofing accessory 11 or in communication with each integrated roofing accessory 11 as part of the software defined network 30. In some embodiments, the MEC 32 may include a CPU 321, a memory 322, a non-transitory storage device 323 among other processing devices and components (e.g., GPUs, NPUs, codecs, DAC, ADC, etc.). In some embodiments, the MEC 32 is integrated onto the same board or PCB as the SDR 31 module such that, e.g., compute, memory and/or storage resources are shared. However, in some embodiments, the MEC 32 may be a separate set of processing resources relative to the SDR 31 module.

In some embodiments, the MEC 32 may control the software defined network 30, including, e.g., implementing Layer 3 through Layer 5, and/or Layers 6 and 7 for data presentation and application functionality, respectively. For example, the MEC 32 may provide a user application functionality to administer network protocols, security policies, flow tables, group tables, among other software administration functionalities pertaining to the implementation of Layer 1 through Layer 5 described above. Accordingly, the MEC 32 is effectively the control module for the software defined network 30 implemented by one or more integrated roofing accessories 11 with user definable policies via, e.g., suitable user interfaces and network messaging protocols. Such user interfaces may provide the user with administrative functionality to control the software defined network 30 and components therein, as well as to collect and locally store data and service metrics relative to the operation of the components and the software defined network 30. Thus, the MEC 32 may include a suitable processing package including the CPU 321, memory 322 and non-transitory storage device 323 for generating and providing to a user the user interface in a network management console. Such processing package may include, e.g., PCB mounted CPU 321, memory 322 and non-transitory storage device 323 and/or a system-on-chip, and/or other suitable processing package. For example, the MEC 32 may include, e.g., a Raspberry Pi, Arduino, Nvidia TX2, or other configurable processing package.

In some embodiments, multiple integrated roofing accessories 11 with respective antennae 313 through 316 may be networked together using unmanned vehicle navigation signals to create a broader software defined network 30. Such a broader network may be leveraged to implement a distributed datacenter 33 across the integrated roofing accessories 11 on the network. Accordingly, the software defined network 30 may be configured to share storage 331 and compute 332 resources for distributed processing and storage of user data, e.g., received via the customer access radio 34 and shared across integrated roofing accessories 11 via antennae 313 through 316. Such a distributed datacenter 33 may be employed for, e.g., cloud storage, media and data streaming, content distribution (e.g., as a content distribution network (CDN)), among other distributed applications.

In some embodiments, a user may interface directly with the software defined network 30 via a connection using the unmanned vehicle navigation network, or via the customer access radio 34 via a customer access radio enabled device. In some embodiments, the customer access radio 34 includes, e.g., a WiFi radio 342. The customer access radio enabled device may include any computing device having hardware and/or software for communicating with the WiFi radio 342. Accordingly, the integrated roofing accessory 11 using the software defined network 30 may include both cellular connectivity as well as WiFi connectivity or other customer access wireless protocol connectivity, for example, for in-home WiFi using the same integrated roofing accessory 11 that provides cellular carrier or internet-service-provider (ISP) connectivity. In some embodiments, similar to the SDR 31, the customer access radio 34 may include a vFirewall 341 to enhanced security of the software defined network 30.

In some embodiments, the storage 331 may be implemented with suitable storage components such as, e.g., a series for solid state drives (SSD) or M.2 storage drives. M.2 drives are a newer, smaller, and faster variant of an SSD. The storage 331 subsystem may be configured in a Redundant Array of Independent Drives (RAID) variant (5 or 10) or as a Hadoop Distributed Files System (HDFS). Either system provides a level of data security and fault tolerance. HDFS has an advantage with error checking and the ability to assign multiple namenodes. Namenodes are simply indexes to where the data resides. Data Nodes can be configured to store multiple copies of the data across several drives. Namenodes manage data on the data nodes by sector-more granular and removes the need to remove an entire drive from the system like a RAID array. Depending on the RAID level it allows for one or two drive failures and still have the system function normally. However, an additional drive failure would cause catastrophic data loss. So, to prevent data loss, drives will need to be continually replaced.

In comparison, HDFS allows for sector level management per drive. Using HDFS, multiple drives failures does not cause catastrophic failure/data loss. HDFS storage management concern may be on the overall capacity of the system and namenode versus physical drive failure. Therefore, an HDFS managed storage solution may reduce the time and effort required to support an integrated roofing accessory 11 platform.

In some embodiments, complimentary to datacenter 33 storage 331 is compute 332. Compute 332 allows applications and services to be written and operate within a distributed space. Like a typical datacenter or cloud infrastructure, compute 332 may enable services to be deployed across a distributed network. Unlike primary cloud networks, the distributed datacenter 33 of the integrated roofing accessories 11 may not have defined services or applications. Rather, the distributed datacenter 33 may employ compute 332 to have a hypervisor-like service to manage and deploy infrastructure for the user. In some embodiments, each integrated roofing accessory 11 may be a network of dense single board computers (SBC) with multiple cores or embedded servers. Advantageously, such compute 332 solutions may be resilient to extreme environmental conditions, such as, e.g., high temperatures, low temperatures, moisture and humidity, vibrations, shock, among other environmental conditions. An example of a possible SBC or embedded server may include, e.g., a Grizzly VL-ESU-5070, or other suitable device.

In some embodiments, to support data science workloads, pipelines and models GPU may be deployed within the integrated roofing accessory 11 in the software defined network 30 in much the same manner as the CPU. An example SBC that supports high density GPU may include, e.g., Nvidia Jetson Nano or other suitable device.

In some embodiments, the software defined network 30 within and across integrated roofing accessories 11 may be included with a power source. In some embodiments, low-power devices may be employed, such as, e.g., systems-on-chip similar to those used in smartphones and other mobile devices. Accordingly, power may be provided via, e.g., on-board batteries, photovoltaic panel mounted to the same roof as the integrated roofing accessory 11 or as a cover 18 on the integrated roofing accessory 11. However, in some embodiments, to achieve greater range and stability of the unmanned vehicle navigation signal, high power components for a more powerful SDR 31 may be employed. Accordingly, in some embodiments, the integrated roofing accessories 11 may be connected directly to mains power via, e.g., an AC to DC (AC/DC) converter, or to a larger scale solar array installed on the roof or nearby, or both.

In some embodiments, various components and devices, including unmanned vehicle navigation network connected computing devices and the integrated roofing accessories 11 may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile device, messaging device, data communication device, and so forth.

As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

Examples of hardware elements may include processors, microprocessors, circuits, circuit elements (e.g., transistors, resistors, capacitors, inductors, and so forth), integrated circuits, ASIC, PLD, DSP, FPGA, logic gates, registers, semiconductor device, chips, microchips, chip sets, and so forth. In some embodiments, the one or more processors may be implemented as a CISC or RISC processors; x86 instruction set compatible processors, multi-core, or any other microprocessor or CPU. In various implementations, the one or more processors may be dual-core processor(s), dual-core mobile processor(s), and so forth.

In some embodiments, the processing device may include any type of data processing capacity, such as a hardware logic circuit, for example an ASIC and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14)

Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35).NET Framework; (36) Silverlight; (37) Open Web Platform; (38) Oracle Database; (39) Qt; (40) SAP NetWeaver; (41) Smartface; (42) Vexi; and/or (43) Windows Runtime.

In some embodiments, devices and components of the integrated roofing accessories 11 of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, various devices and components of the integrated roofing accessories 11, such as the MEC 32, may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Figure 4A:
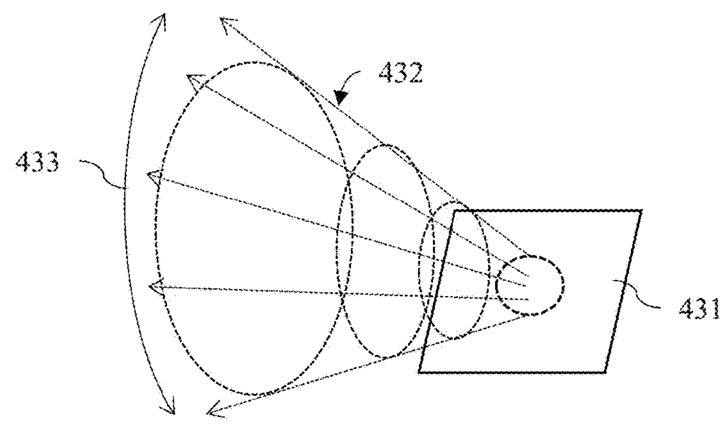
FIGS. 4A and 4B depict non-limiting embodiments depicting arrangements of integrated roofing accessories of FIG. 1 on residential roofs.

FIG. 4A depicts an example unmanned vehicle navigation signal emitted from an antenna 431 of an integrated roofing accessory 11 in accordance with aspects of embodiments of the present description.

In some embodiments, antennae may be directional in nature, as described above, due to factors such as beamforming and antenna shape. Accordingly, an antenna 431 may emit a signal 432 in a conical "field-of-view" (FOV) within which the angular beam steering range 433 over which the antenna 431 can direct a beamformed signal 432. The signal 432 is formed as a beam and may be emitted in any direction within the limits of the FOV of the antenna. In some embodiments, the antenna 431 may have an FOV defined by the beam steering range 433, such as, e.g., within an angle of incidence within 45 degrees, 60 degrees, 70 degrees, or 80 degrees of a normal incidence relative to a surface of the antenna 431, or other similarly suitable angle of incidence. Thus, the beam steering range 433 may cover angles of incidence across various ranges of angles, e.g., 45-90, 45-120, 45-140, 45-160 or other suitable range of angles of incidence of beamformed unmanned vehicle navigation signals emitted from the antenna 431.

Figure 4B:
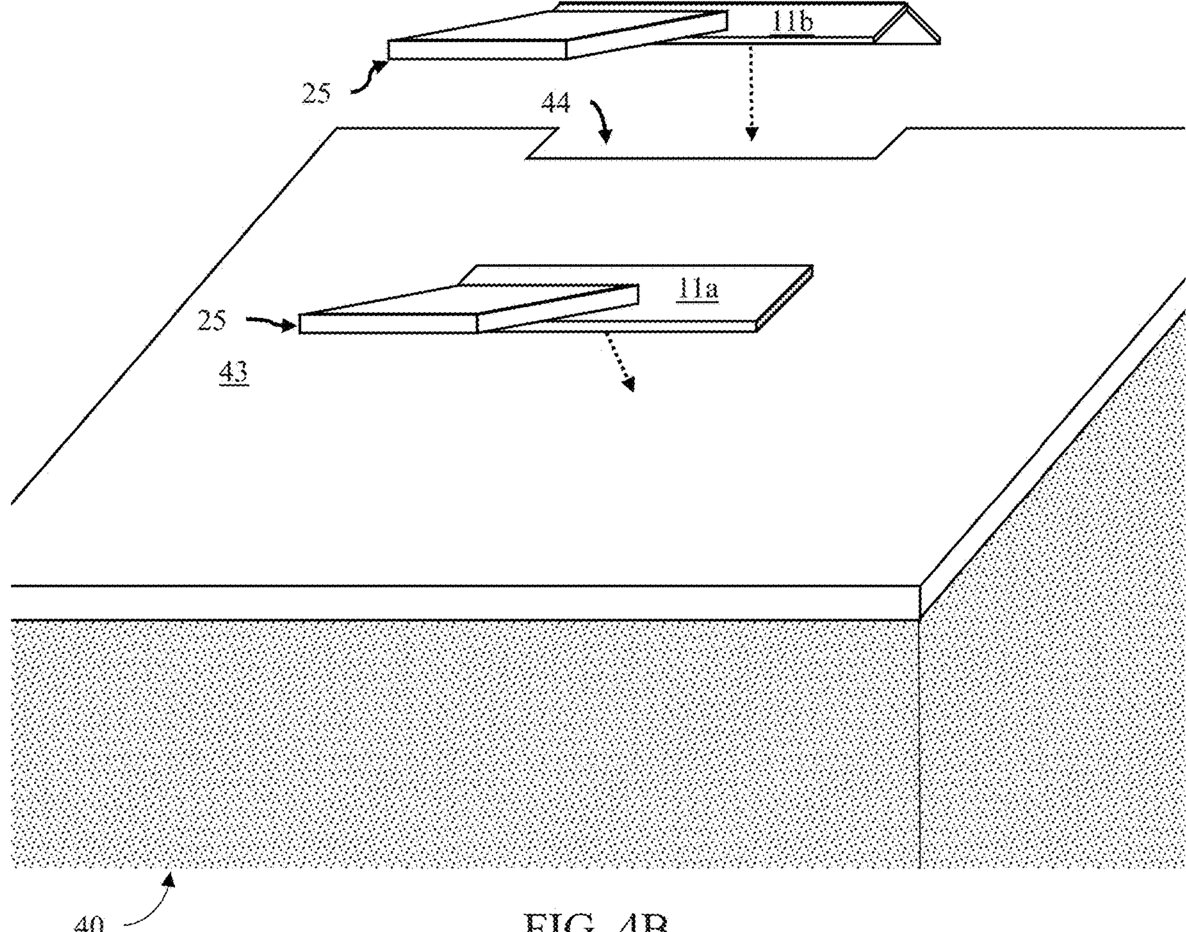

FIG. 4B depicts various integrated roofing accessory antenna placements relative to a roof of a structure in accordance with aspects of embodiments of the present description.

As described above, effectiveness of signal coverage in a physical area is affected by the orientation and position of antennae due to the directional nature imposed by beamforming unmanned vehicle navigation signals. Accordingly, integrated roofing accessories 11 and associated antennae may be installed on a roof 43 as a roofing accessory in one or more of various positions and orientations to best suit the environment.

In some embodiments, an integrated roofing accessory 11 may include a coplanar integrated roofing accessory 431*a*. The coplanar integrated roofing accessory 431*a* is a roofing accessory shaped package (e.g., having a planar shape) that is installed alongside traditional roofing accessories or roofing material on the roof 43 of the structure 40. For example, the coplanar integrated roofing accessory 431*a* may have a shape matching the shingles of a residential home, thus forming a shingle for the roof, or integrated shingle. Thus, a top surface of the coplanar integrated roofing accessory 431*a* may be coplanar with the surrounding roofing material.

In some embodiments, the coplanar integrated roofing accessory 431*a* may have a thickness greater than the surrounding roofing material. In such a case, the coplanar integrated roofing accessory 431*a* may be inserted into a recess within the roof 43 such that a top surface of the coplanar integrated roofing accessory 431*a* is at a height above a top surface of the roof 43 that is coplanar with a top surface of the surrounding roofing material. However, in some embodiments, the coplanar integrated roofing accessory 431*a* may be installed on the top surface of the roof 43 such that the top surface of the coplanar integrated roofing accessory 431*a* rises to a height above the top surface of the roof 43 that is above a height of the top surface of the surrounding roofing material above the top surface of the roof 43.

In some embodiments, the coplanar integrated roofing accessory 431*a* may have the advantages of being roughly flush with the roof 43, providing a discrete device that homeowners or building owners would find less objectionable, and thus be more likely to install. However, the angle of a slope of the roof 43 direct a normal angle of incidence of an antenna of the coplanar integrated roofing accessory 431*a* upward. As a result, due to the beam steering range 433 of the coplanar integrated roofing accessory 431*a* being finite, the portion of the beam steering range 433 that can project a beam formed signal towards a device on the ground is reduced, resulting in less area that may be covered by the coplanar integrated roofing accessory 431*a*. Indeed, where the roof is horizontal, the beam steering range 433 may not extend even towards other integrated roofing accessories because the normal incidence would be directed vertically toward the sky.

Similarly, a ridge vent integrated roofing accessory 431*b* or front or back face siding integrated roofing accessory 431*b* may be employed that can be recessed into a surface of the structure 40 or mounted on the surface of the structure 40 for low profile and discrete installation. However, similar to the coplanar integrated roofing accessory 431*a*, the directional nature of the antenna results in reduced sightlines afforded by the beam steering range 433, and thus reduced coverage. The ridge vent integrated roofing accessory 431*b* may have better coverage because it may be configured to have two antenna portions, with each portion aligning with the slopes of the roof 43 on each side of the ridge, thus multiplying the beam steering range 433. However, each antenna portion nevertheless may have reduced lines of sight to the ground where devices may be located, thus reducing effective coverage in the area.

In some embodiments, to mitigate the coverage loss due to the directionally mounted coplanar integrated roofing accessory 431*a* and the ridge vent integrated roofing accessory 431*b*, multiple roofing accessories may be used on a single roof. In some embodiments, alternatively or in addition, to one or more coplanar integrated roofing accessories 431*a* and one or more ridge vent integrated roofing accessories 431*b* may be installed in the ridge vent of the roof 43. Thus, antennae from the various roofing accessories are angled in multiple directions to provide overlapping beam steering ranges 433 for increased coverage in an area around the roof 43.

Moreover, in some embodiments, the various roofing accessories can be integrated into a mesh network or a common software defined network, such as the software defined network 30 described above. As a result, the roofing accessories can share compute and storage resources, and behave as a cohesive system.

Additionally, or alternatively, each of the coplanar integrated roofing accessories 431*a* may include antennae only or software define radio only, such as the antennae 313 and SDR 31 described above. Each coplanar integrated roofing accessory 431*a* may interface with a hub roofing accessory in the ridge vent to centralize compute, storage, and user access radios in the ridge vent integrated roofing accessory 431*b*. Accordingly, each integrated roofing accessory may represent a modular component of an integrated roofing accessory 11 that may be separately detached and applied to various portions of the roof 43 to optimize coverage, while a control module including the centralized resources may be located in the ridge vent near access to power and infrastructure within the structure 40.

In some embodiments, regardless of the location, each integrated roofing accessory, 431*a* and 431*b*, may be configured to access resources from the structure 40 via the ridge vent. For example, the roofing accessories may include wiring or cabling to connect to mains power, roof mounted solar power, in-structure networking, a hardwire backhaul network (e.g., fiber optic cabling), among other resources routed through the structure 40 via the ridge vent.

Figure 5:
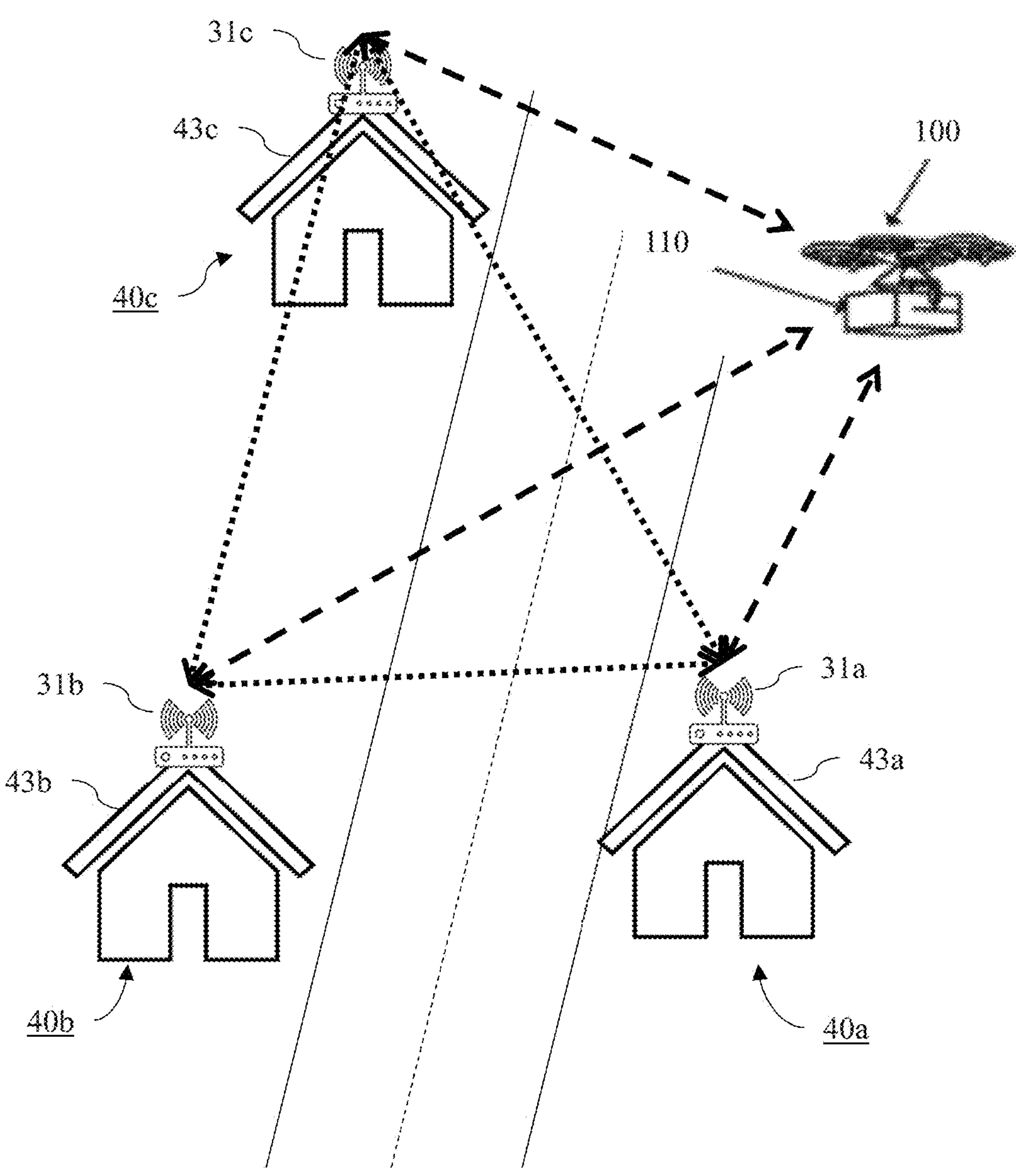
FIG. 5 depicts a non-limiting embodiment depicting integrated roofing accessories of FIG. 1 embedded into various roof locations.

FIG. 5 illustrates an example mesh unmanned vehicle navigation network using integrated roofing accessories installed on roofs of residential homes according to aspects of embodiments of the present description.

In some embodiments, antenna placement in an area can affect unmanned vehicle navigation signal stability and strength because unmanned vehicle navigation signals may be dependent upon the distance and the clearest line of sight for the best possible communication. As such, roof placement for structure-to-structure and the placement on the structure may affect the integrity and strength of the signal.

In some embodiments, each home 40*a*, 40*b* and 40*c* is fitted with an integrated roofing accessory 31*a*, 31*b*, and 31*c*, respectively. The integrated roofing accessories 31*a*, 31*b*, and 31*c* may provide at least two forms of communication: mesh networking with information sharing by signals between each integrated roofing accessory 31*a*, 31*b*, and 31*c* (denoted with dotted lines); and computing device communication providing unmanned vehicle navigation signals to a computing device, such as the at least one unmanned vehicle 100 (denoted with dashed lines).

In order to deliver reliable connectivity to a user in the presence of obstacles, the mesh unmanned vehicle navigation network may include an access point network built with redundancies of antennae of the integrated roofing accessories 31*a* through 31*c*. There may be enough redundancy such that, in the event of LOS blocking, the network connection of the at least one unmanned vehicle 100 can be rapidly rerouted via another (e.g., from the integrated roofing accessory 31*a* to integrated roofing accessories 31*b* or 31*c*). In such an access point network, or mesh unmanned vehicle navigation network, a cluster of access points (e.g., integrated roofing accessories 31*a*, 31*b*, and 31*c*) may be coordinated to provide uninterrupted connectivity to the at least one unmanned vehicle 100. By using such a cluster of access points, the network may overcome radio-link blockages due to obstacles.

In some embodiments, mesh networking, or the inter-home communication, supports network administration, maintenance and backhaul communication to the network. In some embodiments, each structure or home 40*a*, 40*b* and 40*c* may maintain communication with as many structures as possible in the event a structure goes away or there is a better path back to the network. Thus, in some embodiments, data transmission from a computing device back to a backhaul infrastructure may be dynamically managed within the network of integrated roofing accessories 31*a*, 31*b*, and 31*c*. For example, a primary data connect for the at least one unmanned vehicle 100 may be provided by home 40*b* because the integrated roofing accessories 31*b* and 31*c* with line-of-sight (LOS) to the at least one unmanned vehicle 100 may communicate with each other to determine that integrated roofing accessory 31*b* has a stronger connection, and thus greater signal strength and signal integrated, resulting in greater speeds, greater stability, and decreased error rates and drop-outs.

As described above, each computing device on the unmanned vehicle navigation network (e.g., the at least one unmanned vehicle 100, a smartphone, a computer, a WiFi hotspot, among other devices) may be served by a cluster of integrated roofing accessories 31*a*, 31*b*, and 31*c*. In some embodiments, the integrated roofing accessories 31*a*, 31*b*, and 31*c* may be selected to be members of the cluster set of a computing device based on which integrated roofing accessories 31*a*, 31*b*, and 31*c* are accessible by the device.

In some embodiments, each integrated roofing accessory 31*a*, 31*b*, and 31*c* may be considered to be accessible if the device can receive a beacon waveform via the integrated roofing accessory 31*a*, 31*b*, and 31*c*. For example, in some embodiments, the integrated roofing accessories 11 may be installed on top of buildings, such as each residential home 40*a*, 40*b* and 40*c*. As a result of shadowing loss characteristics, the radio link between the at least one unmanned vehicle 100 and serving access point, e.g., antenna of integrated roofing accessory 31*a*, antenna of integrated roofing accessory 31*b* and/or antenna of integrated roofing accessory 31*c*, may be disrupted if the LOS between the at least one unmanned vehicle 100 and the access point is blocked by obstacles. For example, where the at least one unmanned vehicle 100 passes close to another building with another antenna of integrated roofing accessory 31*a*, the LOS may be broken by the roof 43*a*, or the antenna of the integrated roofing accessory 31*a* may not have the angular range to direct a beamformed signal to the location of the at least one unmanned vehicle 100. Additionally, the distance of the at least one unmanned vehicle 100 to any one of the antennae of integrated roofing accessories 31*a*, 31*b*, or 31*c* may exceed the propagation distance of the corresponding signals. The beacon waveform may be used to determine whether the LOS and distance are sufficient for any particular one or more of the integrated roofing accessories 31*a*, 31*b* and 31*c* to communicate unmanned vehicle navigation signals to the at least one unmanned vehicle 100.

In some embodiments, among the integrated roofing accessories 31*a*, 31*b*, and 31*c*, one particular integrated roofing accessory (e.g., integrated roofing accessory 31*b*) can be selected as the serving integrated roofing accessory 31*b* for the device, e.g., the at least one unmanned vehicle 100 to prevent or minimize the blocking and other disruptions. In some embodiments, the at least one unmanned vehicle 100 may select the serving integrate roofing accessory, and/or integrated roofing accessories 31*a*, 31*b* or 31*c* in the mesh unmanned vehicle navigation network may cooperatively identify the serving roofing accessory based on the strength and stability of test signals using, e.g., the beacon waveform.

For example, to select the integrated roofing accessory to serve the at least one unmanned vehicle 100 or other device, the beacon waveform may be a broadcast beacon or a swept beam beacon, whose reception has a signal-to-noise-ratio (SNR) threshold above a certain threshold or above the beacon waveform of each other integrate roofing accessory 31*a*, 31*b* and 31*c*. Accessibility information of each integrated roofing accessory 31*a*, 31*b*, and 31*c* by the at least one unmanned vehicle 100 may indicate the best, e.g., transmit and receive beam weights, the antenna polarization (e.g. horizontal, vertical or circular) and the corresponding signal strengths. The transmit and receive antenna weights having the greatest signal strength and stability may determine the antenna directivity for a multi-element antenna array. The antenna weights can be implemented using either an analog, digital or hybrid implementation. Other implementations of directional antennas could also be supported by this description. For example, a dielectric lens antenna can focus electromagnetic energy through diffraction similar to how an optical lens focuses light. The antenna directivity of a dielectric lens antenna is controlled by configuring the switching feed elements.

In some embodiments, each integrated roofing accessory 31*a*, 31*b* and 31*c* may then collaborate to provide navigation instructions to the at least one unmanned vehicle 100 via the antenna directivity and a selected integrated roofing accessory having the greatest signal strength. In some embodiments, the mesh unmanned vehicle navigation network may therefore facilitate navigation of the at least one unmanned vehicle 100.

In some embodiments, each integrated roofing accessory 31*a*, 31*b*, and 31*c* may be associated with a particular location, such as a house or building address, latitude-longitude location, or other geospatial or cartographic location. One or more of the integrated roofing accessories 31*a*, 31*b*, and 31*c* may communicate via the mesh unmanned vehicle navigation network with the at least one unmanned vehicle 100 via the unmanned vehicle navigation signals. In some embodiments, the selected integrated roofing accessory may poll the at least one unmanned vehicle 100 for a location of the at least one unmanned vehicle 100 and a destination of the at least one unmanned vehicle 100, such as, e.g., a delivery location associated with the at least one delivery item 110. Based on the destination returned by the at least one unmanned vehicle 100, the selected integrated roofing accessory may communicate over the mesh unmanned vehicle navigation network (e.g., utilizing one or more network messages) with each additional integrated roofing accessory of the integrated roofing accessories 31*a*, 31*b* and 31*c* to determine which of the integrated roofing accessories 31*a*, 31*b* and 31*c* is located or nearest to the destination. For example, the selected integrated roofing accessory may request a location associated with each integrated roofing accessory 31*a*, 31*b*, and 31*c*, and compare each location to the destination. Based on a distance of each location from the destination, the selected integrated roofing accessory may determine the nearest one of the integrated roofing accessories 31*a*, 31*b*, and 31*c* to communicate with.

In some embodiments, the selected integrated roofing accessory may then transmit electronic operating instructions to the at least one unmanned vehicle 100. In some embodiments, the electronic operating instructions may include navigation instructions, such as, e.g., dynamic heading adjustments according to a direction of travel of the at least one unmanned vehicle 100 such that the selected integrated roofing accessory may direct the at least one unmanned vehicle 100 to its destination. In some embodiments, the electronic operating instructions may include a trail of latitude-longitude coordinates to follow, or a heading (e.g., according to a compass).

In some embodiments, the selected integrated roofing accessory may be continuously or periodically updated. Accordingly, beacon waveforms may be regularly tested for each integrated roofing accessory 31*a*, 31*b*, and 31*c* to select the integrated roofing accessory 31*a*, 31*b*, and 31*c* with the greatest signal strength. Upon a new integrated roofing accessory being selected, the integrated roofing accessory 31*a*, 31*b*, and 31*c* responsible for transmission of the electronic operating instructions to the at least one unmanned vehicle 100 may be switched to the new integrated roofing accessory by being structed via one or more network messages. However, to prevent unnecessary switching, the signal strength may be compared against a threshold signal improvement measure such that the signal strength of the new integrated roofing accessory is greater than, e.g., 5%, 10%, 12%, 15%, 20% or other percent improvement over the signal strength of the selected integrated roofing accessory.

In some embodiments, upon the location of the at least one unmanned vehicle 100 matching the destination, the electronic operating instructions may include at least one landing instruction instructing the at least one unmanned vehicle 100 to land at the destination. Upon landing, the at least one unmanned vehicle 100 may deposit the at least one delivery item 110 at the destination (e.g., in a receptacle 25, in front of an associated structure, on an at least one landing member 22, or at some other delivery point). In some embodiments, upon depositing the at least one delivery item 110, the selected integrated roofing accessory may send electronic operating instructions including at least one take-off instruction instructing the at least one unmanned vehicle 100 to take off.

In some embodiments, there are other reasons to instruct the at least one unmanned vehicle 100 land, such as to charge, to avoid flying in inclement weather, for repair, or other suitable reasons. Accordingly, the selected integrated roofing accessory may provide the at least on landing instruction upon detecting the reason, e.g., via a message from the at least one unmanned vehicle 100 (e.g., indicating a need to charge or for repair), or from another service or another integrated roofing accessory (e.g., upon inclement weather being detected). In such scenarios, the at least on landing instruction may include a nearest integrated roofing accessory to the location of the at least one unmanned vehicle 100, and instructions to navigate to the nearest integrated roofing accessory and land, e.g., on the landing member mounted thereon.

In some embodiments, the integrated roofing accessories 31*a*, 31*b*, and 31*c* may wait to provide electronic operating instructions to the at least one unmanned vehicle 100 until requested by the at least one unmanned vehicle 100. For example, in inclement weather, the at least one unmanned vehicle 100 may lose connection with a global positioning system (GPS) and require navigation assistance. In some embodiments, upon the request, the selected integrated roofing accessory may provide the electronic operating instructions to navigate to the destination or to another landing spot.

In some embodiments, the beam synchronization may be maintained, e.g., by selecting the best beams for downlink (DL) and uplink (UL) communication with each of the integrated roofing accessories 31*a*, 31*b*, and 31*c* as the at least one unmanned vehicle 100 moves physically through the network. Based on signal characteristics, e.g., detected by the integrated roofing accessories 31*a*, 31*b* and 31*c* or the at least one unmanned vehicle 100, or both, the servicing integrate roofing accessory may be maintained or changed as shadowing, blockage and distance to the at least one unmanned vehicle 100 changes. For example, the serving roofing accessory may be tested for strength and integrity of signal each, e.g., 1 millisecond (ms), 10 ms, 100 ms, 250 ms, 500 ms, 1 second, 5 seconds, 10 seconds, or other testing frequency.

In some embodiments, the maximize the area covered by unmanned vehicle navigation signals from the integrated roofing accessories 31*a*, 31*b* and 31*c*, the integrated roofing accessories 31*a*, 31*b* and 31*c* may be installed onto the respective roofs 43*a*, 43*b*, and 43*c* in an optimum roofing configuration, such as the configurations described above with reference to FIG. 5.

In some embodiments, the mesh network may support backhaul by, e.g., forcing Border Gateway Protocol (BGP). BGP can support fast route switching of large networks. In addition, BGP may function as a routing bridge between wireless and wired networks. However, other suitable routing protocols may be employed instead or in addition.

Figure 6:
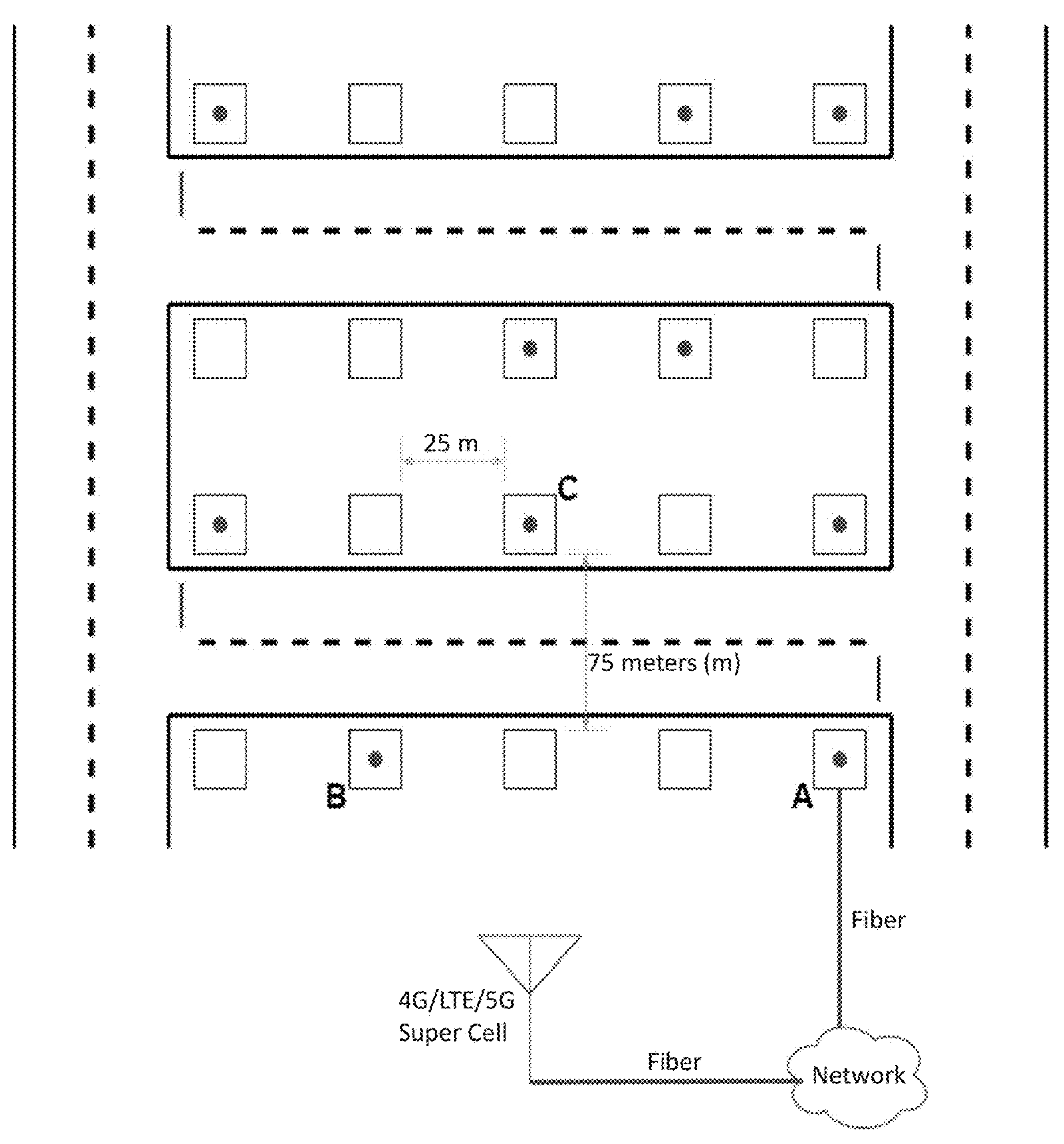
FIG. 6 depicts a non-limiting embodiment depicting an arrangement of the integrated roofing accessories of FIG. 1 across an area for coverage over a whole area with unmanned vehicle navigation network.

FIG. 6 depicts a diagram illustrative of embodiments of the present description including a residential neighborhood. Based upon statistics and sampling, roofing material is installed on one of three homes in the United States. The distribution may likely be more or less than 1 of 3. Generally, when roofing tracks are installed a contractor will choose a brand of roofing accessories for the roofing for most properties.

The circles on the homes represent the structures with the integrated roofing accessory 11. At the bottom of the diagram there are two sources of network access for the unmanned vehicle navigation network: Structure-A which is directly connected to fiber back to the network and the other, a super cell that connects to Structures A and B via wireless backhaul.

For Structure-A, the primary backhauls, and network access may be provided by the directly connected fiber. Secondary backhaul and network access will be provided by the wireless supercell. The tertiary network access for Structure-A will come from Structure-B which is wireless connected to the supercell.

Structures-A, B, and C and the other structures with circles represent and participate in the unmanned vehicle navigation network. Each blue dot/structure will have multiple dynamic paths/connection to the network and services, plus the internet.

At least one aspect of the present disclosure will now be described with reference to the following non-limiting embodiments.

E1: A device comprising:

at least one integrated roofing accessory, wherein the at least one integrated roofing accessory comprises:

at least one roofing accessory component; and at least one antenna embedded within the at least one roofing accessory component, wherein the at least one antenna is configured to transmit global positioning system (GPS) signals to at least one unmanned vehicle 100;

at least one power unit embedded within the at least one roofing accessory component;

wherein the at least one power unit is configured to charge the at least one unmanned vehicle 100.

E2: A system comprising:

at least one integrated roofing accessory, wherein the at least one integrated roofing accessory comprises:

at least one roofing accessory component, and at least one first antenna embedded within the at least one roofing accessory component, wherein the at least one first antenna is configured to transmit global positioning system (GPS) signals;

at least one power unit embedded within the roofing accessory component; and at least one unmanned vehicle 100;

wherein the at least one unmanned vehicle 100 comprises:

at least one second antenna, wherein the at least one second antenna is configured to receive the GPS signals transmitted by the at least one first antenna; and a battery, wherein the battery is configured to be charged by the at least one power unit.

At least some aspects of the present disclosure will now be described with reference to the following numbered clauses:

Clause 1. A system comprising:

an integrated roofing accessory that is integrated into a roof; and wherein the integrated roofing accessory comprises:

at least one antenna;

a computing module in communication with the at least one antenna; wherein the computing module comprises at least one processor and a non-transitory memory storage having software stored thereon; wherein the computing module, when the software is executed by the at least one processor, is configured to transmit, via the at least one antenna:

i) electronic operating instructions to at least one unmanned vehicle, and ii) network messages related to the at least one unmanned vehicle to at least one additional integrated roofing accessory on at least one additional roof;

wherein the at least one additional integrated roofing accessory is configured to transmit the electronic operating instructions to the at least one unmanned vehicle; and a landing member that is positioned on the roof;

wherein the electronic operating instructions comprise:

i) at least one landing instruction configured to cause the at least one unmanned vehicle to land on the landing member, and ii) at least one take-off instruction configured to cause the at least one unmanned vehicle to take off from the landing member.

Clause 2. A system comprising:

a plurality of integrated roofing accessories are integrated into a plurality of roofs; wherein each integrated roofing accessory of the plurality of integrated roofing accessories comprises:

at least one antenna;

a computing module in communication with the at least one antenna; wherein the computing module comprises at least one processor and a non-transitory memory storage having software stored thereon; wherein the computing module, when the software is executed by the at least one processor, is configured to transmit, via the at least one antenna:

i) electronic operating instructions to at least one unmanned vehicle, and ii) network messages related to the at least one unmanned vehicle to each integrated roofing accessory;

wherein the plurality of integrated roofing accessories are configured to transmit the electronic operating instructions to the at least one unmanned vehicle;

a plurality of landing members that are positioned on the plurality of roofs;

wherein the electronic operating instructions comprise:

i) at least one landing instruction configured to cause the at least one unmanned vehicle to land on a particular landing member of the plurality of landing members, and ii) at least one take-off instruction configured to cause the at least one unmanned vehicle to take off from the particular landing member.

Clause 3. A method comprising:

obtaining an integrated roofing accessory;

wherein the integrated roofing accessory comprises: at least one antenna;

a computing module in communication with the at least one antenna; wherein the computing module comprises at least one processor and a non-transitory memory storage having software stored thereon; wherein the computing module, when the software is executed by the at least one processor, is configured to transmit, via the at least one antenna:

i) electronic operating instructions to at least one unmanned vehicle, and ii) network messages related to the at least one unmanned vehicle to at least one additional integrated roofing accessory on at least one additional roof;

wherein the at least one additional integrated roofing accessory is configured to transmit the electronic operating instructions to the at least one unmanned vehicle;

mounting the integrated roofing accessory on a roof;

obtaining a landing member;

mounting the landing member on the roof; and wherein the electronic operating instructions comprise:

i) at least one landing instruction configured to cause the at least one unmanned vehicle to land on the landing member, and ii) at least one take-off instruction configured to cause the at least one unmanned vehicle to take off from the landing member.

Clause 4. A method comprising:

controlling, by at least one processor of a computing device of an integrated roofing accessory, at least one antenna according to software to transmit:

i) electronic operating instructions to at least one unmanned vehicle, and ii) network messages related to the at least one unmanned vehicle to at least one additional integrated roofing accessory on at least one additional roof;

wherein the at least one additional integrated roofing accessory is configured to transmit the electronic operating instructions to the at least one unmanned vehicle;

wherein the integrated roofing accessory is installed on a roof;

causing, by the at least one processor via the network messages, the integrated roofing accessory, the at least one additional integrated roofing accessory, or both, to communicate with at least one unmanned vehicle; and causing, by the at least one processor via the network messages, the at least one unmanned vehicle to navigate to a landing member positioned on the roof.

Clause 5. The systems and methods of any of clauses 1 through 4, wherein the landing member is directly connected to the integrated roofing accessory.

Clause 6. The systems and methods of any of clauses 1 through 4, wherein the landing member is a horizontal platform.

Clause 7. The systems and methods of any of clauses 1 through 4, wherein the at least one unmanned vehicle is configured to transport at least one delivery item, and wherein the system further comprises a receptacle that is configured to accept the at least one delivery item.

Clause 8. The systems and methods of clause 7, wherein the landing member comprises the receptacle.

Clause 9. The systems and methods of any of clauses 1 through 4, wherein the landing member is configured to allow the at least one unmanned vehicle to be electrically charged from a power supply.

Clause 10. The systems and methods of any of clauses 1 through 4, wherein the at least one antenna is embedded within a surface of the integrated roofing accessory.

Clause 11. The systems and methods of any of clauses 1 through 4, wherein the integrated roofing accessory and the at least one additional integrated roofing accessory form a computer network based at least in part on the network messages.

Clause 12. The systems and methods of any of clauses 1 through 4, wherein the integrated roofing accessory has a right edge, a left edge, a front edge, and a back edge;

wherein one or more of the right edge, the left edge, the front edge, and the back edge is configured to contact at least one additional roofing accessory on the roof.

Clause 13. The systems and methods of clause 12, wherein the at least one additional roofing accessory further comprises at least one shingle that is made from a roofing material.

Clause 14. The systems and methods of clause 12, wherein one or more of the right edge, the left edge, the front edge and the back edge is configured to contact the at least one additional roofing accessory on the roof such as to form a seal between the integrated roofing accessory and the at least one additional roofing accessory.

Clause 15. The systems and methods of any of clauses 1 through 4, further comprising a water shedding layer provided on the roof; and wherein the integrated roofing accessory is mounted over the water shedding layer.

Clause 16. The systems and methods of any of clauses 1 through 4, wherein the integrated roofing accessory has a planar shape; and wherein the integrated roofing accessory is configured to be installed on a face of the roof.

Clause 17. The systems and methods of any of clauses 1 through 4, wherein the integrated roofing accessory has a ridge shape; and wherein the integrated roofing accessory is configured to be installed in a ridge vent of the roof.

Clause 18. The systems and methods of any of clauses 1 through 4, wherein the plurality of integrated roofing accessories comprises at least three integrated roofing accessories integrated into at least three roofs.

While several embodiments of the present disclosure have been described, these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. An integrated roofing accessory comprising:

at least one roofing accessory component for installation on a roof of a structure;

at least one frame defined at least partially by the at least one roofing accessory component;

wherein the at least one frame comprises at least one compartment internal to the at least one frame;

wherein the at least one compartment, when the integrated roofing accessory is installed on the roof, is disposed between the at least one roofing accessory component and the structure;

wherein the at least one frame holds at least one antenna and at least one computing module;

wherein the computing module is configured to transmit, via the at least one antenna, at least one electronic communication to at least one unmanned vehicle;

wherein the at least one electronic communication is configured to provide at least one unmanned vehicle navigation instruction to the at least one unmanned vehicle.

2. The integrated roofing accessory of claim 1, wherein at least one unmanned vehicle navigation instruction is configured to instruct the at least one unmanned vehicle to navigate to a landing location associated with the structure.

3. The integrated roofing accessory of claim 2, wherein the landing location comprises a landing member in proximity to the structure.

4. The integrated roofing accessory of claim 1, wherein the at least one antenna is embedded within a surface of the at least one roofing accessory component.

5. The integrated roofing accessory of claim 1, wherein the computing module is configured to transmit, via the at least one antenna, at least one network communication with at least one additional integrated roofing accessory to form a computer network.

6. The integrated roofing accessory of claim 5, wherein the computer network comprises a distributed datacenter.

7. The integrated roofing accessory of claim 1, wherein the at least one frame, comprising the at least one roofing accessory component, has a planar shape and is configured to be installed on a face of the roof.

8. The integrated roofing accessory of claim 1, wherein the at least one frame, comprising the at least one roofing accessory component, has a non-planar shape and is configured to be installed on a ridge of the roof.

9. The integrated roofing accessory of claim 1, wherein the at least one roofing accessory component comprises at least one of:
- a roofing cap,
- a laminate roofing accessory,
- a roofing sheet,
- a ridge cap,
- a ridge vent,
- a roof vent,
- a roofing frame, or
- a roofing shingle.

10. The integrated roofing accessory of claim 1, further comprising at least one indicator, wherein the at least one indicator comprises at least one of:
- at least one radio frequency identification (RFID) tag,
- at least one Near Field Communication (NFC) tag,
- at least one barcode,
- at least one Quick Response (QR) code,
- at least one location identification marking, or
- at least one electronic display device.

11. The integrated roofing accessory of claim 1, wherein the computing module is further configured to:
- receive, via the at least one antenna, at least one electronic response communication from the at least one unmanned vehicle in response to the at least one electronic communication;
  - wherein the at least one electronic communication is configured to cause the at least one unmanned vehicle to report, via the at least one electronic response communication, a parcel identifier associated with a parcel being carried by the at least one unmanned vehicle; and
- track a location of the parcel based at least in part on a structure location associated with the structure and the at least one electronic communication with the at least one unmanned vehicle.

12. An integrated roofing accessory comprising:
- at least one roofing accessory component for installation on a roof of a structure;
  - wherein the at least one roofing accessory component comprises at least one of:
    - a roofing cap,
    - a laminate roofing accessory,
    - a roofing sheet,
    - a ridge cap,
    - a ridge vent,
    - a roof vent,
    - a roofing frame, or
    - a roofing shingle;
- at least one frame defined at least partially by the at least one roofing accessory component;
  - wherein the at least one frame comprises at least one compartment internal to the at least one frame;
  - wherein the at least one compartment, when the integrated roofing accessory is installed on the roof, is disposed between the at least one roofing accessory component and the structure;
  - wherein the at least one frame holds at least one antenna and at least one computing module;
  - wherein the computing module is configured to communicate, via the at least one antenna, with at least one unmanned vehicle.

13. The integrated roofing accessory of claim 12, wherein at least one unmanned vehicle navigation instruction is configured to instruct the at least one unmanned vehicle to navigate to a landing location associated with the structure.

14. The integrated roofing accessory of claim 13, wherein the landing location comprises a landing member in proximity to the structure.

15. The integrated roofing accessory of claim 12, wherein the at least one antenna is embedded within a surface of the at least one roofing accessory component.

16. The integrated roofing accessory of claim 12, wherein the computing module is configured to transmit, via the at least one antenna, at least one network communication with at least one additional integrated roofing accessory to form a computer network.

17. The integrated roofing accessory of claim 16, wherein the computer network comprises a distributed datacenter.

18. The integrated roofing accessory of claim 12, wherein the at least one frame, comprising the at least one roofing accessory component, has a planar shape and is configured to be installed on a face of the roof.

19. The integrated roofing accessory of claim 12, wherein the at least one frame, comprising the at least one roofing accessory component, has a non-planar shape and is configured to be installed on a ridge of the roof.

20. The integrated roofing accessory of claim 12, further comprising at least one indicator, wherein the at least one indicator comprises at least one of:
- at least one radio frequency identification (RFID) tag,
- at least one Near Field Communication (NFC) tag,
- at least one barcode,
- at least one Quick Response (QR) code,
- at least one location identification marking, or
- at least one electronic display device.

* * * * *